(12) United States Patent
Slupik et al.

(10) Patent No.: US 12,206,947 B2
(45) Date of Patent: *Jan. 21, 2025

(54) SYSTEM TO DISPATCH VIDEO DECODING TO DEDICATED HARDWARE RESOURCES

(71) Applicant: Genetec Inc., St-Laurent (CA)

(72) Inventors: Andre Slupik, Montreal (CA); Xavier Berard, Laval (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/402,995

(22) Filed: Jan. 3, 2024

(65) Prior Publication Data

US 2024/0348882 A1 Oct. 17, 2024

Related U.S. Application Data

(63) Continuation of application No. 15/682,004, filed on Aug. 21, 2017, now Pat. No. 11,917,249, which is a continuation of application No. 14/806,025, filed on Jul. 22, 2015, now Pat. No. 10,542,233, which is a continuation-in-part of application No. 14/520,662, filed on Oct. 22, 2014, now abandoned.

(51) Int. Cl.
| | |
|---|---|
| H04N 21/47 | (2011.01) |
| G06T 1/20 | (2006.01) |
| G11B 20/00 | (2006.01) |
| H04N 7/01 | (2006.01) |
| H04N 7/18 | (2006.01) |
| H04N 19/156 | (2014.01) |
| H04N 21/418 | (2011.01) |
| H04N 21/4223 | (2011.01) |
| H04N 21/431 | (2011.01) |
| H04N 21/485 | (2011.01) |

(52) U.S. Cl.
CPC ............... *H04N 21/47* (2013.01); *G06T 1/20* (2013.01); *G11B 20/00007* (2013.01); *H04N 7/0122* (2013.01); *H04N 7/181* (2013.01); *H04N 19/156* (2014.11); *H04N 21/4183* (2013.01); *H04N 21/4223* (2013.01); *H04N 21/4316* (2013.01); *H04N 21/485* (2013.01); *G11B 2020/00072* (2013.01)

(58) Field of Classification Search
None
See application file for complete search history.

(56) References Cited

U.S. PATENT DOCUMENTS

| | | |
|---|---|---|
| 7,321,368 B2 | 1/2008 | Owen et al. |
| RE43,462 E | 6/2012 | Washino et al. |
| 8,499,055 B2 | 7/2013 | Lee et al. |
| 8,681,859 B2 | 3/2014 | Washington |

(Continued)

FOREIGN PATENT DOCUMENTS

CA 2909021 A1 12/2004

OTHER PUBLICATIONS

Corresponding Canadian patent application No. 2,961,808 Office Action dated Aug. 20, 2021.

(Continued)

*Primary Examiner* — Peter D Le

(74) *Attorney, Agent, or Firm* — Anglehart et al.

(57) ABSTRACT

A system to perform processing operations of input (video) streams, including is disclosed. The system consists of an input module, a stream type detection engine, a plurality of processing resources a resource monitoring engine, an attribution module, a dispatching module, and various other optional interface modules.

17 Claims, 11 Drawing Sheets

(56) References Cited

U.S. PATENT DOCUMENTS

| | | |
|---|---|---|
| 2002/0052914 A1 | 5/2002 | Zalewski et al. |
| 2002/0120741 A1 | 8/2002 | Webb et al. |
| 2003/0189581 A1 | 10/2003 | Nasoff et al. |
| 2004/0190617 A1 | 9/2004 | Shen et al. |
| 2004/0257223 A1 | 12/2004 | Webb, Sr. |
| 2005/0207488 A1 | 9/2005 | Ouyang et al. |
| 2007/0106999 A1 | 5/2007 | Zhang |
| 2007/0172199 A1 | 7/2007 | Kobayashi et al. |
| 2007/0273699 A1 | 11/2007 | Sasaki et al. |
| 2008/0140990 A1 | 6/2008 | YasukaWa |
| 2008/0240236 A1 | 10/2008 | Uchida et al. |
| 2008/0271035 A1 | 10/2008 | YasukaWa |
| 2009/0080533 A1 | 3/2009 | Folta et al. |
| 2009/0094481 A1 | 4/2009 | Vera et al. |
| 2009/0245662 A1 | 10/2009 | Ueda et al. |
| 2009/0268820 A1 | 10/2009 | Nishida |
| 2010/0007646 A1 | 1/2010 | Tsuei et al. |
| 2010/0013757 A1 | 1/2010 | Ogikubo |
| 2010/0158471 A1 | 6/2010 | Ogikubo |
| 2010/0332909 A1 | 12/2010 | Lars |
| 2011/0023040 A1 | 1/2011 | Hendry et al. |
| 2011/0096168 A1 | 4/2011 | Siann et al. |
| 2011/0167457 A1 | 7/2011 | Yagi et al. |
| 2011/0211036 A1 | 9/2011 | Tran |
| 2011/0212761 A1 | 9/2011 | Paulsen et al. |
| 2011/0292057 A1 | 12/2011 | Schmit et al. |
| 2011/0304634 A1 | 12/2011 | Urbach |
| 2012/0042275 A1 | 2/2012 | Neerudu et al. |
| 2013/0021350 A1 | 1/2013 | Schmit et al. |
| 2013/0173765 A1 | 7/2013 | Korbecki |
| 2013/0188732 A1 | 7/2013 | Zhou et al. |
| 2013/0207983 A1 | 8/2013 | Ro et al. |
| 2013/0238912 A1 | 9/2013 | Priel et al. |
| 2013/0258358 A1 | 10/2013 | Qian et al. |
| 2014/0049548 A1 | 2/2014 | Rao et al. |
| 2014/0181421 A1 | 6/2014 | O'Connor et al. |
| 2014/0189708 A1 | 7/2014 | Lee et al. |
| 2014/0205008 A1 | 7/2014 | Wu |
| 2014/0259022 A1 | 9/2014 | Jung |
| 2014/0359324 A1 | 12/2014 | Park et al. |
| 2015/0186158 A1 | 7/2015 | Yalamanchili et al. |
| 2018/0253314 A1 | 9/2018 | Packer Ali et al. |

OTHER PUBLICATIONS

Corresponding Canadian patent application No. 2,961,808 Office Action dated Jan. 18, 2023.
Corresponding Canadian patent application No. 2,961,808 Office Action dated Dec. 27, 2023.
Corresponding European patent application No. 15852616.0 Supplementary European search report dated May 4, 2018.
Corresponding Canadian patent application No. 15852616.0 Office Action dated Jan. 16, 2019.
International application No. PCT/CA2015/051062 International Search Report dated Jan. 21, 2016.
International application No. PCT/CA2015/051062 Written Opinion of the International Searching Authority dated Jan. 21, 2016.
International application No. PCT/CA2015/051062 International Preliminary Report on Patentability Chapter II dated Jan. 25, 2017.

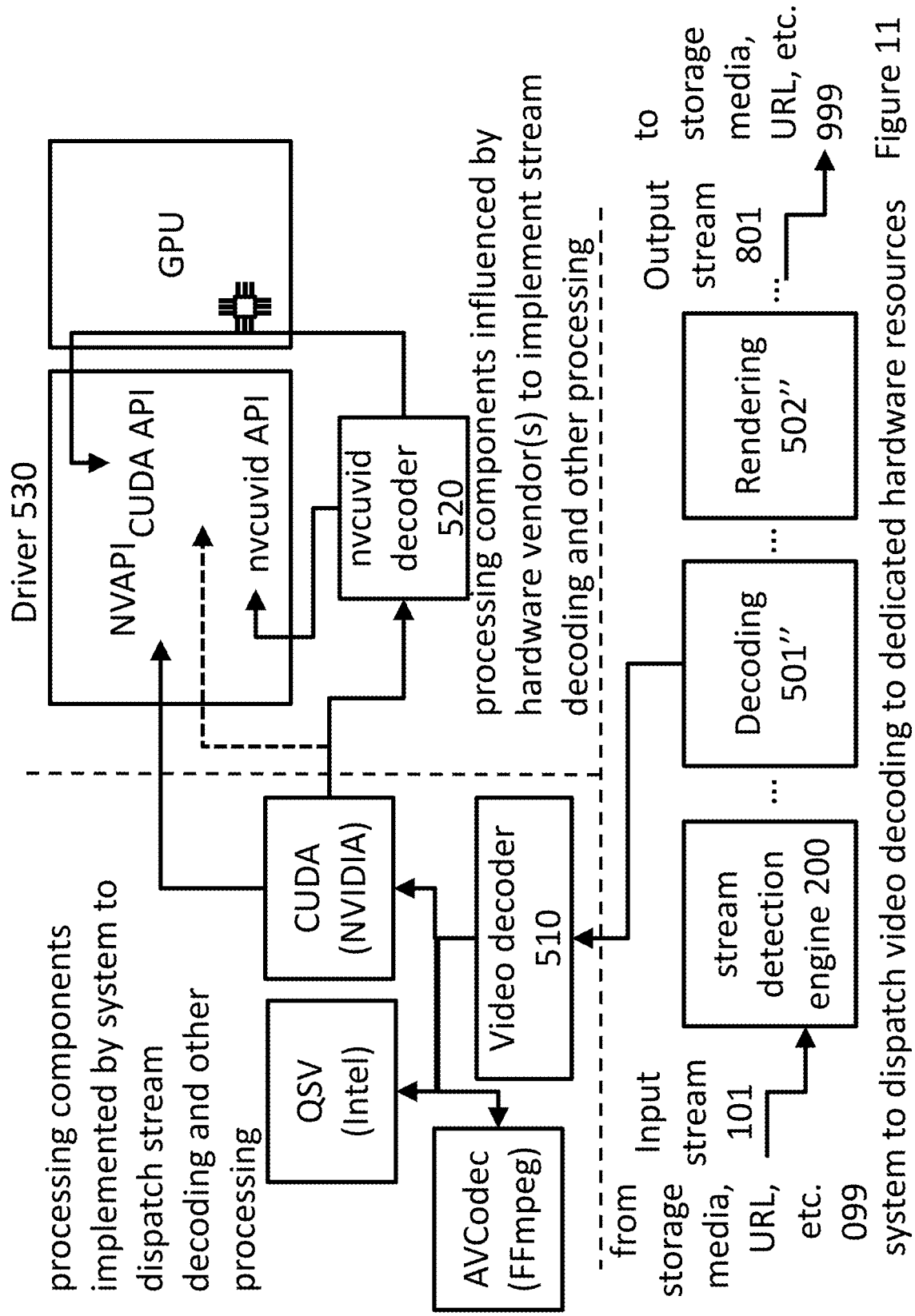

SYSTEM TO DISPATCH VIDEO DECODING TO DEDICATED HARDWARE RESOURCES

CROSS-REFERENCE TO RELATED APPLICATIONS

The present application is a continuation of U.S. patent application Ser. No. 15/682,004 filed on Aug. 21, 2017, now allowed, in turn, is a continuation of U.S. patent application Ser. No. 14/806,025 filed on Jul. 22, 2015, now U.S. Pat. No. 10,542,233 issued Jan. 21, 2020, in turn, is a continuation-in-part of U.S. patent application Ser. No. 14/520,662 filed on Oct. 22, 2014, the contents of which are hereby incorporated by reference.

TECHNICAL FIELD

The present invention relates to the field of data stream processing and is particularly directed toward video decoding and other image processing tasks using various processing resources. In addition, the present invention relates to human-machine interaction with applications involving said image processing tasks, particularly in the fields of the security, surveillance, and access control.

BACKGROUND

The demands placed on computers in recent years, both in terms of the variety of tasks to perform, the amount of data to process, and the performance expected from the computing systems themselves, have grown considerably. The advance of computing technology has coincided with and arguably fostered the pervasiveness of large sets of data. Indeed, the emergence of the term "Big data" as a blanket term to describe large and complex data sets in addition to the latter's numerous attendant challenges bears witness to the ongoing realities of the present climate.

Among the increased demands made of computing systems are those pertaining to the acquisition and processing of multimedia data. Content—and indeed much multimedia content—is typically packaged into streams. Such streams may represent and encapsulate, for instance, video, audio, and any other sorts of data, in addition to metadata of several types and intended for various purposes. Fields of application in which such data acquisition and processing are encountered include those involving security and surveillance-related activities. Of particular importance in such fields is the ability for humans to view streams of data (sometimes called "feeds") with the best possible quality.

Too often, security desks or video walls are populated with a number of camera feeds whose image quality or framerates (and sometimes both) are low. An impaired ability to properly view the contents of a feed, whether through jittery feeds or poor image quality, may in some cases constitute mere visual inconvenience; however, in other cases, it may severely hamper the ability of security or law enforcement personnel to adequately perform their duties when responding to incidents. Particularly in the latter cases, the authorities' inability to respond to incidents in a timely manner often carries a cost, whether in terms of damage to property or compromised health and safety of individuals.

Very often, the aforementioned inability to adequately view feeds, especially when such feeds are captured at high resolutions and framerates, is the result of poor decoding capabilities of the system(s) involved in displaying them. Decoding and other processing of streams—particularly media streams—to ultimately present resulting streams to human operators in an acceptable form and quality is a comparatively processing-intensive activity.

Processing such data may be done by one or more general purpose processors present within a computer system. One paradigm proposed in various cases and implemented in different settings over the years is the offloading of specific types of processing. This paradigm namely involves routing certain tasks away from general purpose processors and onto specialized hardware, with the latter having varying degrees of autonomy. The prevalence of video data is associated with growing ubiquity of capture sources in addition to enhanced transmission means, such as broadband. Typically, such data streams are encoded in any one of several formats by their capture devices or in attendant source systems or capture modules. Likewise, a corresponding decoding action, in addition to any additional and contextually relevant image processing operations, must be completed for such streams to be viewed and their contents understood by a human operator with any subsequent action taken thereupon.

Methods for accelerating the viewing, decoding, and/or processing of (particularly video) streams have been proposed in the art. Some of these methods involve the use of graphics processing units, with various levels of human operator intervention or resource monitoring. Unfortunately, many of these methods are not optimally adapted to the tasks of adequately monitoring the content of the video frames and determining how best to perform the processing from among available processing means. Further still, these methods are inadequately adapted to contemporary user experience expectations; this is particularly evident in display wall interfaces incapable of displaying large numbers of high-definition streams with sufficiently rapid response, both in terms of rapid response to user input specified through increasingly common means (such as tactile displays) as well as in carrying out stream decoding tasks, displaying numerous high-resolution streams at full framerate, performing zooming on a region of interest while retaining said full framerate, or other processing tasks, in many cases as a function of human input. Furthermore, the possibility of specifying said processing-intensive operational parameters in bulk (i.e. applied to a large number of streams at once) with minimal (if any) corresponding jitter, is lacking in present systems. Likewise, the ability for a human user to trade off or relax one preference to correspondingly favor another (as between decoding or zooming quality versus retaining full framerate), is similarly lacking at the present time. Accordingly, the ability for a system to dynamically respond to such user-specified preferences—by switching or routing processing commands among multiple available processing resources while operation is underway all while affording the aforementioned possibilities to users, is likewise not attested in systems known in the art.

In certain implementations, both the inherent nature and the adaptability of stream processing mechanisms to adequately handle the format of input streams are particularly deficient. This is in part attributable to trends within the camera (or related imaging device) manufacturing industry, some of whose attempts to gain in efficiency through innovative approaches in encoding streams have ironically given rise to significant challenges in decoding such streams. Such device manufacturers are faced with a dual challenge. On the one hand, they must strive to achieve the highest possible image quality and/or in making ever more efficient use of bandwidth with respect to generating and transferring image data. On the other, the devices they produce must operate within a framework of widely known technical video encoding standards.

Difficulties are encountered despite vendors' efforts to balance both innovative optimizations with compliance. Such difficulties typically flow from technical particularities observed in cases where optimizations include novel techniques, creative modifications in the manner in which camera devices generate standardized stream. In other cases, difficulties can likewise flow from the occasional necessity of dropping processing of a number of frames in one or more streams due to a saturation of existing processing resources, whether CPU- or GPU-based, within a closed system. Inadvertent departures, from image or video encoding standards for example, accordingly result in related challenges by entities seeking to decode such image streams. Tasks relating to the decoding of streams are particularly significant and can be a source of particular vulnerability when issues in this vein are encountered. Furthermore, decoding-related issues can occur at the development stage or even following deployment. Decoding issues are likewise associated with a failure on the part of a camera manufacturer, a decoder provider, and/or a software vendor to scrupulously follow one or more specific aspects of a video standard to be decoded. Camera and device manufacturers' stringent adherence to standards is thus important to ensure proper and consistent performance of decoding mechanisms downstream.

A corollary to this observation is that deviations from established technical specifications represent an important vulnerability that can trouble the operation of stream-based software systems. The likelihood of operational incompatibilities resulting from deviation from standards is lessened, for example, in cases where both camera vendor, codec developer, and software provider are the same party or otherwise collaborate in implementing a proprietary, specific, or otherwise uncertified derivations. However, issues can still result in environments where interoperation of hardware and software components is expected or ought to be anticipated. This might arise in cases where camera vendor, codec developer and software provider are different parties whose products are integrated by yet another party. It will be further appreciated that in deployments, an accumulation of various deviations from standards—in turn by various hardware and software components—multiplies potential functional vulnerabilities if not compounds operational difficulties encountered. While in certain cases, disparities cause minimal to no cross-system issues, in others, such disparities can render a stream partially or entirely impossible to decode. Difficulties inherent in decoding or even processing a media stream can pose particular issues to software vendors providing solutions that integrate products and devices both upstream and downstream from the vendors' own product offerings. Such vendors are dependent upon devices produced by other manufacturers, but vulnerable to such devices' potential, unforeseen, or otherwise unorthodox departures from known or standard behavior.

Development of GPU or other hardware-based processing libraries is typically done on a proprietary basis with a functionality whose scope targets narrower use-cases and is comparatively more specific than those done for CPU-based operation. As a result, growth and development of GPU-based decoding components is motivated primarily by and to a large extent dependent upon such developers' commercial considerations and interests. By comparison, the latter GPU-based decoding libraries in many cases provide functionality whose correct operation is comparatively and significantly less predictable, such as when a camera dynamically changes output parameters mid-stream. The issue is likewise even more problematic in cases where a security camera or other stream-originating device was previously compliant to a standard and ceases to be so, such as through the introduction of such a dynamic change in output parameters.

Such lack of operational predictability, particularly in the context of a load-balanced processing system represents a serious and growing problem. This is particularly the case as more highly optimized cameras or imaging devices having output formats which depart from established specifications proliferate the market. A mechanism by which to ensure a decoding paradigm with a successful outcome is required for cases where such decoding and/or related processing difficulties undermine the degree to which streams can be fully deciphered and accordingly become usable for handling or display.

Responding to such changes presents its share of challenges and impediments. This is particularly the case when the changes to constituent stream parameters are typically not codified within a particular specification generally known in the art. Decoding functionality for such streams is typically absent. On the one hand, such absence can in certain scenarios be deliberate. This might occur in cases where camera vendors might deliberately wish to restrict decoding or other operational capabilities to a specific proprietary software ecosystem. On the other hand, lack of supplied decoding functionality can occur because a deviation from a standard is entirely unintentional and otherwise unanticipated. Other circumstances varying between deliberate and inadvertent absence of decoding capabilities can also be encountered within deployment scenarios. Collaboration with camera vendors to align with existing standards is one option. However, for commercial reasons, camera vendors can in other cases choose to entirely forego the expense—both in development effort and other costs—of bringing their camera output formats into full compliance with a specification.

While possibilities for decoding and other stream-related processing in the art have been growing, particularly with regards to dedicated hardware, so too have been the shortcomings associated with said possibilities, particularly given the growing number of cameras or imaging sources, and the impossibility to validate their use with general purpose security software components intended to interoperate with all of them. Accordingly, a solution to such shortcomings is increasingly necessary in the art.

Such are objects of the invention described herewith.

SUMMARY

The present invention may typically be implemented on any of several platforms, including a security video monitoring workstation, one or several computers, and/or homologous processors (FIGS. 5, 10).

According to a first aspect of the present invention, input media streams 101, 102, 103, typically carrying video, but possibly any other media type, are received by an input module 100 from a source 099, 099'. The streams' payload is detected 150 by a stream detection engine 200 which may inspect the streams' headers as a key part of the payload detection 150 action to positively identify the nature of a given stream 101, 102, 103 and generate a stream payload analysis result 250. In another embodiment, and particularly in cases where a stream's data format is unknown or not otherwise identified or detectable, the nature of a stream may be inferred through a deeper inspection of the characteristics of said stream.

The result 250, 250' is provided to the attribution module 600 and forms a partial basis of the elements upon which said attribution 600 module relies to determine which of any processing resources 501, 502, 503 available within the resource pool 500 may be called upon to perform a specified processing task, such as decoding an encoded video input stream 101. Such processing resources may include GPUs for video processing, particularly for use in compute-intensive processing operations. Other operations may include decompression (whether as part of, or separate from, a generic understanding of decoding) as well as any other processing task. Other elements involved in this process include configuration information or user-provided instructions 350, additionally supplied or otherwise provided through an operator input module 300 which may include a user interface and the ability to transmit and receive information from an external system, and which may optionally include other human interface devices. The resource pool 500 communicates with the attribution module 600, in some cases by way of an intermediary resource monitoring engine 400. When it is present, the resource monitoring engine 400 monitors the load 450 of the resource pool 500 at configurable intervals and communicates information, and in turn communicates resource utilization data information 640 to the attribution module 600.

In accordance with another aspect of embodiments of the present invention, the operator input module 300 may be absent, with configuration information and instructions 350 being received externally.

The attribution module 600 thus receives up to three distinct varieties of information; this information consists, namely, of the exact nature of the streams to be processed 250, on the current processing resources and capabilities to perform said processing 640, and user-supplied configuration instructions 350. On the basis of these three types of information, the attribution module 600 formulates an explicit assignment, called a routing command 650, of media stream(s) 101, 102, 103 to available processing resource(s) 501, 502, 503.

The attribution module 600 typically generates routing commands 650 to respond to evolving conditions that the attribution module 600 gleans from aforementioned input elements 250, 350, 640. A single routing command 650 may be generated to assign a single processing resource 501 to a single input media stream 101; alternatively, permutations involving a plurality of the foregoing may be likewise envisioned.

In accordance with a further aspect of embodiments of the present invention, the resource monitoring engine 400 may be absent, with load monitoring 450 and utilization data query 640 tasks subsumed into a more simplified and direct link between resource pool 500 and attribution module 600. In such cases, operator input module 300 is present and plays a role in establishing more rigid load attribution policy among resources 501, 502, 503 present in the pool 500.

In implementations, the resource monitoring engine 400, when present, can additionally monitor the operational health and status of the various processing resources 501, 502, 503 present within the resource pool 500 by way of pool load monitor 450 activities. Detection of incorrect functionality, such as inability to decode an input media stream 101, 102, 103 already attributed to a specific processing resource 501, 502, 503 already in progress, can be made by the resource monitoring engine 400. Occurrences of incorrect functionality, with specific details on issues detected, can accordingly be communicated to the attribution module 600 for further action.

The dispatching module 700 receives routing commands 650 generated by the attribution module 600. It subsequently 700 puts these 650 into action by accessing the input media stream(s) 101, 102, 103 present in the input module 100 and by directing 750 said stream(s) to the processing resource(s) 501, 502, 503 so that requisite processing may be performed.

Alternatively, and in accordance with a still further aspect of the present invention, an update on a previously issued routing command 650 may be issued by the attribution module 600. Such an amended routing command 650' may result from changing processing demand observed at the input module 100 or from changing processing resource capability in the resource pool 500 (such as through the engagement/allocation, freeing, addition or removal of processing resources). The amended routing command 650' directs the dispatching module 700 to carry out a previously-issued routing command 650 under a resource use policy more consistent with, compatible to, or representative of previously supplied configuration information and/or instructions 350.

In accordance with a still further aspect of embodiments of the present invention, said amended routing command 650' may be directed toward an already issued routing command 650 whose execution may already be in progress.

An amended routing command 650' can likewise be generated in the separate case in which a processing resource 501 within the resource pool 500 suddenly ceases to function or inadvertently fails to properly operate. This can be caused by a data error in the stream, or, more frequently, a change in stream parameters. A change in stream parameters might be triggered on any range of possible elements; this might happen, for instance, when a compression type or even a specific encoding parameter of an input media stream 101 changes in the midst of streaming operation, such change occurring in a manner inadvertent to or unexpected by the surveillance system. In certain cases, the underlying driver might not anticipate or expect such changes—and in some cases unexpectedly frequent ones. In certain cases, such an amended routing command 650' can be generated by the attribution module 600 to inform the dispatching module 700 to direct a given input media stream 101, to a different processing resource 502 more robust or otherwise able to carrying out the required processing operation(s) successfully. Cases where decoding or other processing tasks are split or otherwise shared between GPUs and one or more CPUs represent an example of heterogeneous computing. This is particularly the case in implementations where decision-making tasks and execution of such tasks are implemented on both dedicated hardware (e.g. one or more GPUs) and general purpose computing hardware (e.g. a CPU or similar general-purpose software-executing platform).

In accordance with a further aspect of embodiments of the present invention, an output module 800 may receive from the pool 500 the results of aforementioned processing. The contents of said output module 800 typically consist of output media stream(s) 801 corresponding to the result of processing initially requested via the aforementioned configuration information and/or instructions 350.

A human or other operator can report or otherwise signal the occurrence of a malfunction via the operator input module 300. This option can be particularly desirable in cases where an amended routing command 650' is not or cannot be generated by the attribution module 600 itself (such as for want of such functionality implemented within the attribution module 600).

In accordance with a still further aspect of embodiments of the present invention, output streams 801, in addition to other externally available streams 099 may be received by a display management module 900 (FIGS. 5, 10) and be displayed by the latter 900 in a multi-tile or multi-window layout. Advanced human interface capabilities may be available directly on said display management module 900. Alternatively, operator input 950 received at said display management module may be integrated to the aforementioned operator input module 300. Such operator input 950 may include selecting a high-resolution video stream there displayed 900 for purposes of specifying some additional manipulation operation, such the particular region of interest on which to zoom, or likewise specifying whether or not to maintain said stream's full framerate throughout a processing operation.

The result 801 of said processing may be additionally forwarded to a peripheral destination 999.

BRIEF DESCRIPTION OF THE DRAWINGS

The invention will be better understood by way of the following detailed description of embodiments of the invention with reference to the appended drawings, in which:

FIG. 11 is a block diagram showing a high-level view of an embodiment's various functional software and hardware modules and components involved in implementing decoding and other processing on GPU hardware.

DETAILED DESCRIPTION

Input Module

Figure 1:
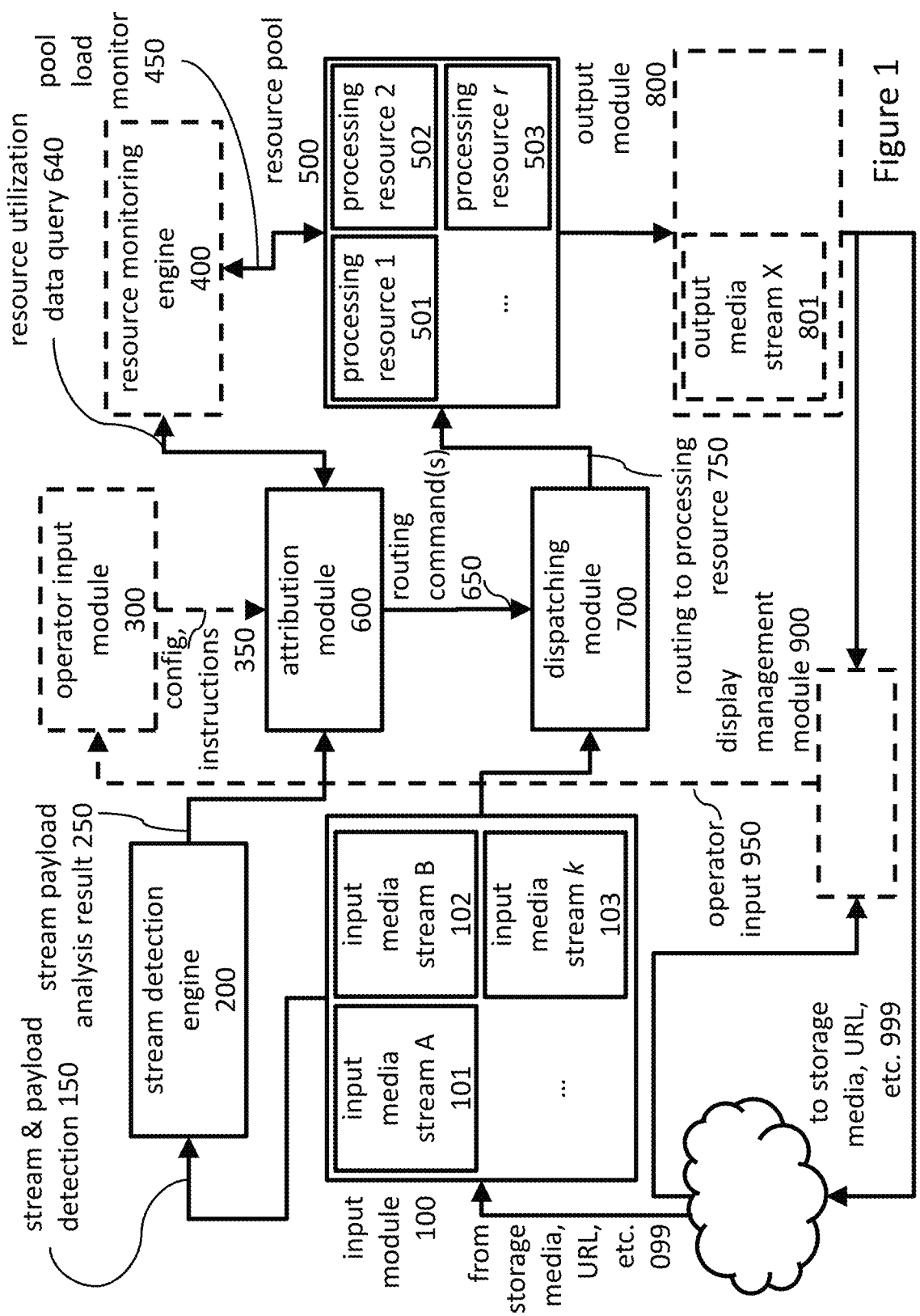
FIG. 1 is a block diagram showing an overview of the various modules of an embodiment of the present invention, in addition to the relationships and information flows therebetween.
Figure 2:
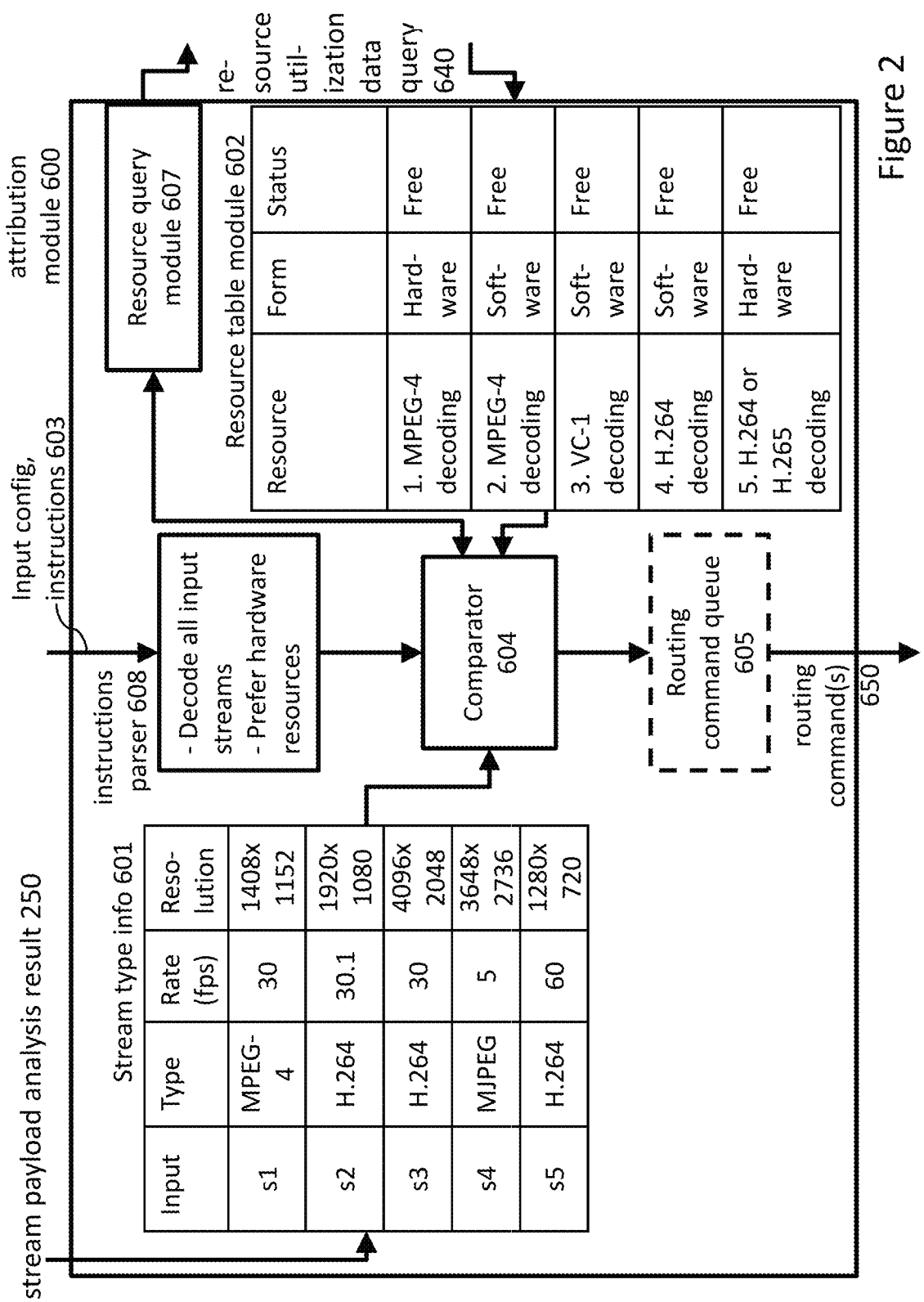
FIG. 2 is a block diagram showing an enlarged view of the attribution module of an embodiment of the invention.
Figure 3:
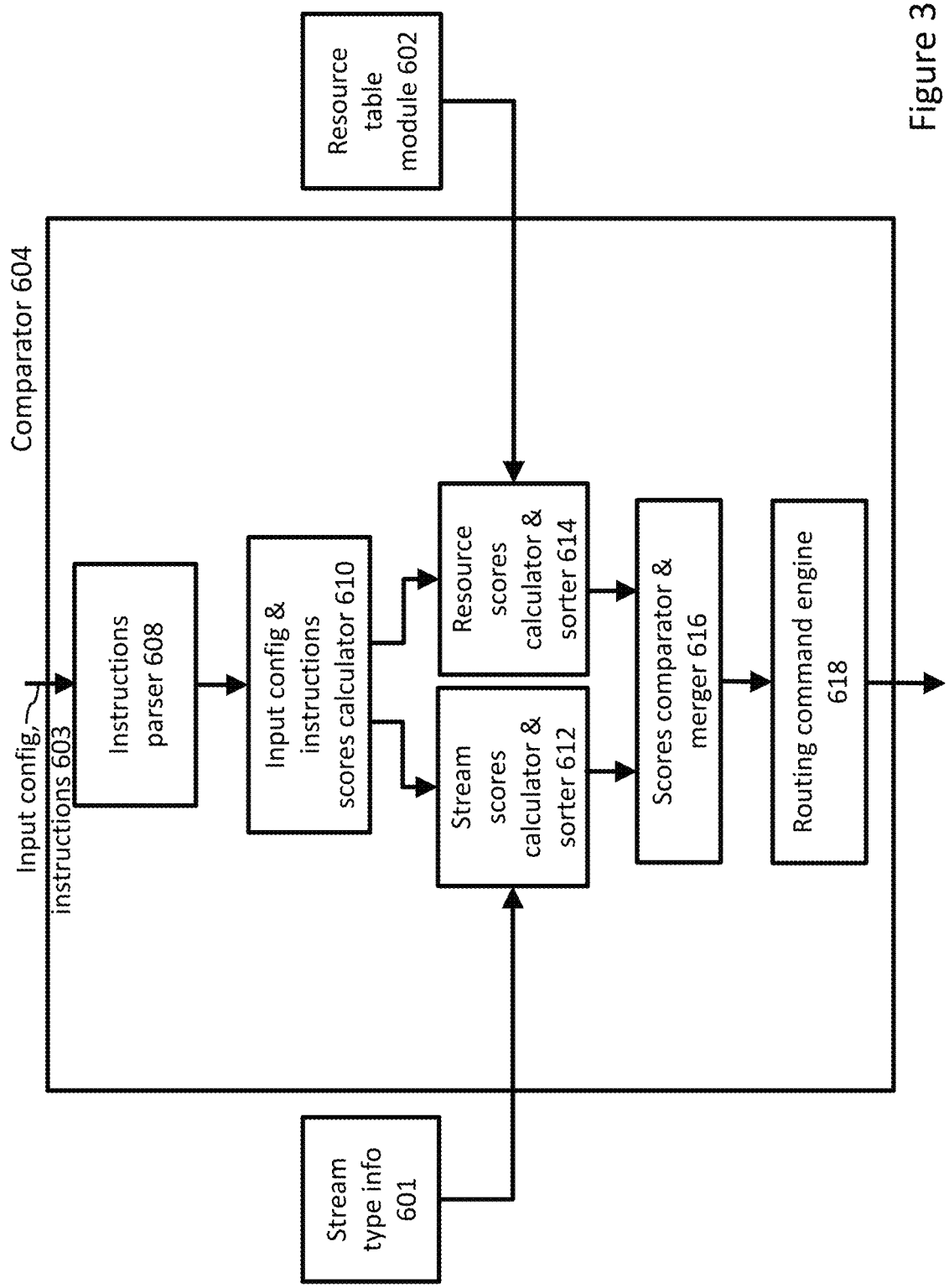
FIG. 3 is a block diagram showing an enlarged view of the comparator module of an embodiment of the invention.
Figure 4:
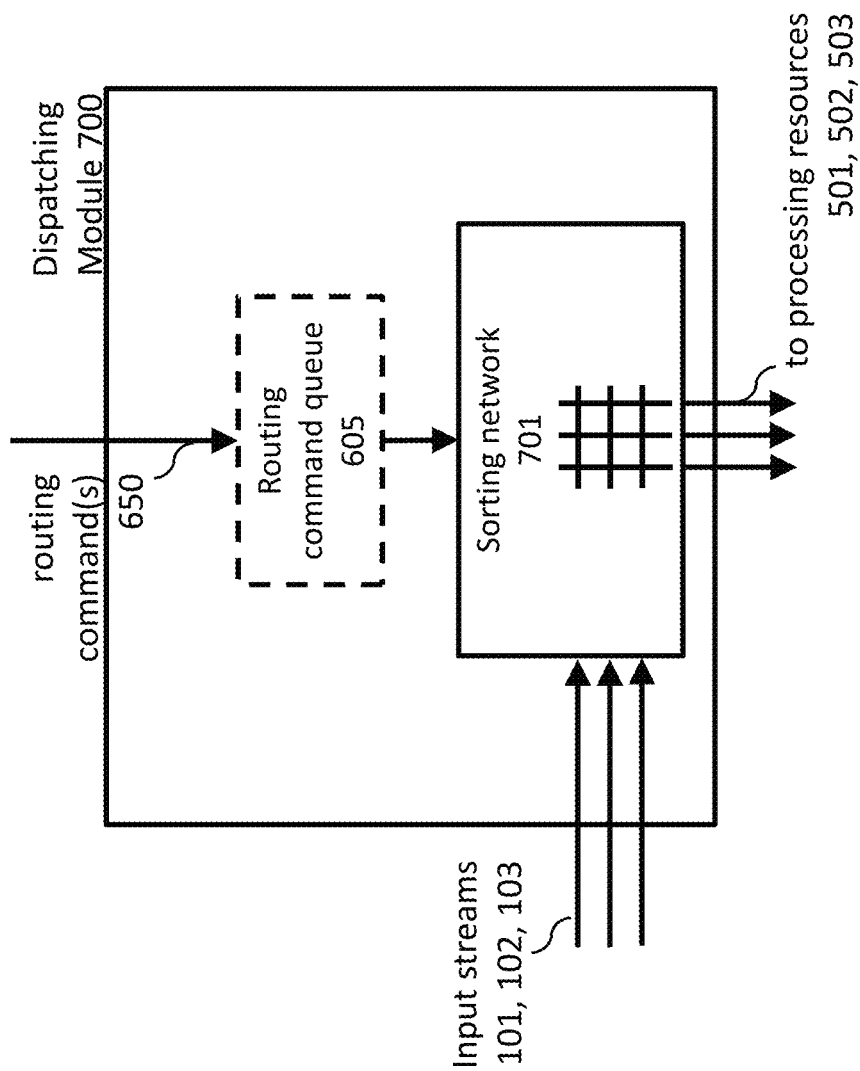
FIG. 4 is a block diagram showing an enlarged view of the dispatching module of an embodiment of the invention.
Figure 5:
FIG. 5 is a screenshot of an example embodiment depicting a display management module showing dynamic attribution of streams to different processing resources for decoding and display.

Embodiments of the present system may be implemented and/or deployed on one or several computers, monitoring workstations, and/or homologous processors. With reference to FIG. 1, media streams are received by a processing system from one or more external sources. The specific types of sequences of data elements that make up a media stream accepted by one or more embodiments of the present invention may be restricted to a specific set of video data having a specific encoding or video compression format, which as an exemplary enumeration, but without limitation, may include, H.264, H.265, MPEG-4, or MJPEG.

In other embodiments, the types and formats of data streams accepted may be far less restricted. Accordingly, sources 099 for the aforementioned media streams may unlimitedly include any one or more of an image or video capture device such as a camera, a local hard drive, media server, or remote network location. Additional sources for input media streams may include sensors capable of receiving, measuring, or converting information or data—whether simultaneously or non-concurrently—that is contextually relevant to the aforementioned media stream sources. Such additional input media sources may include, without limitation, sound, GPS coordinates, human, biometric, object identification, validation, or other telemetric data.

In other embodiments, metadata resulting from more complex event processing may form part or all of a media stream. In various embodiments, the acceptability of an input media stream 101, 102, 103 follows said stream's intelligibility to the system; such as may be enabled, in several embodiments, through the presence of one or more appropriate media codecs or other software or hardware capability, to decode or otherwise render intelligible one or more streams stored in one or more different formats.

In at least one embodiment of the present invention, input media streams 101, 102, 103, each whether of identical or differing types, and in accordance with the capacity of the system, are received 099 by the input module 100 for handling by said embodiment. In a further series of embodiments, said input module 100 may passively receive or actively fetch input media streams from any source 099 external to the system, or admit a mixture of these stream inputting means. In a still further series of embodiments, streams received by the input module 100 may be duplicates or dedicated local copies of those received from external sources 099 for the exclusive use of embodiments of the present invention. Such dedicated copies may be desired for the added efficiency and convenience they offer to the deployment or execution of an embodiment of the present invention, such as to minimize latency at the moment of processing, or to help ensure the integrity of one or more input streams 101, 102, 103. In a still further series of embodiments, streams received by the input module 100 may be implicit or explicit references to said streams 101, 102, 103. Said access of streams 101, 102, 103 by reference in lieu of an implicit duplication streams is ideally governed by an appropriate semaphore or equivalent mechanism to support mutual exclusion of said stream use by multiple systems for handling by one or more embodiments of the present invention.

In another series of embodiments of the present invention, the organization and layout of the input module 100 may vary. As with various modules further described herein, input module 100 need not be understood to be necessarily contiguous, either in a physical or conceptual sense; for example, portions of the module may be implemented in just one or alternatively across multiple locations and interconnected through a network. In at least one embodiment, for example, one or more additional input modules 100' may coexist and correspondingly provide input media streams 101', 102', 103' to the system. The purpose of such additional input modules 100' may reflect any number of abstractions or criteria, including without limitation, additional physical locations of streams, distinct stream fetching and/or access policies, or specific types or classes of image or other data contained. In certain deployments for example, streams contained within one or more input modules can be stored using an AVPacketstruct of the FFmpeg library, known in the art.

In addition to the one or more media sources 099 described previously, input module 100 and any one or more complements 101' communicate information, when so inspected and detected 150, about the payload of every stream 101, 102, 103 entering the input module 100 for handling by an embodiment of the present invention. Extraction of such information is key to allowing embodiments of the present invention to identify each of the input media streams 101, 102, 103 received from external sources 099 to prepare embodiments of the present invention for the eventual processing tasks to be performed on them, as will be further described herein. Details surrounding the necessary identification and subsequent communication of such information 150 regarding said streams 101, 102, 103 will be discussed presently.

Stream Detection Engine

Knowledge about the specific nature of input media streams 101, 102, 103 received by the input module 100 is vital to the function of embodiments of the present invention. The behavior of modules further discussed herein and indeed progress and execution under different operational scenarios and circumstances depend significantly upon the types of data received by said embodiments. Accordingly, embodiments of the present invention may obtain such knowledge via any one or several means. A stream detection engine 200, dedicated to the positive identification of incoming streams 101, 102, 103, provides an expedient modular abstraction obtain such knowledge.

Figure 6:
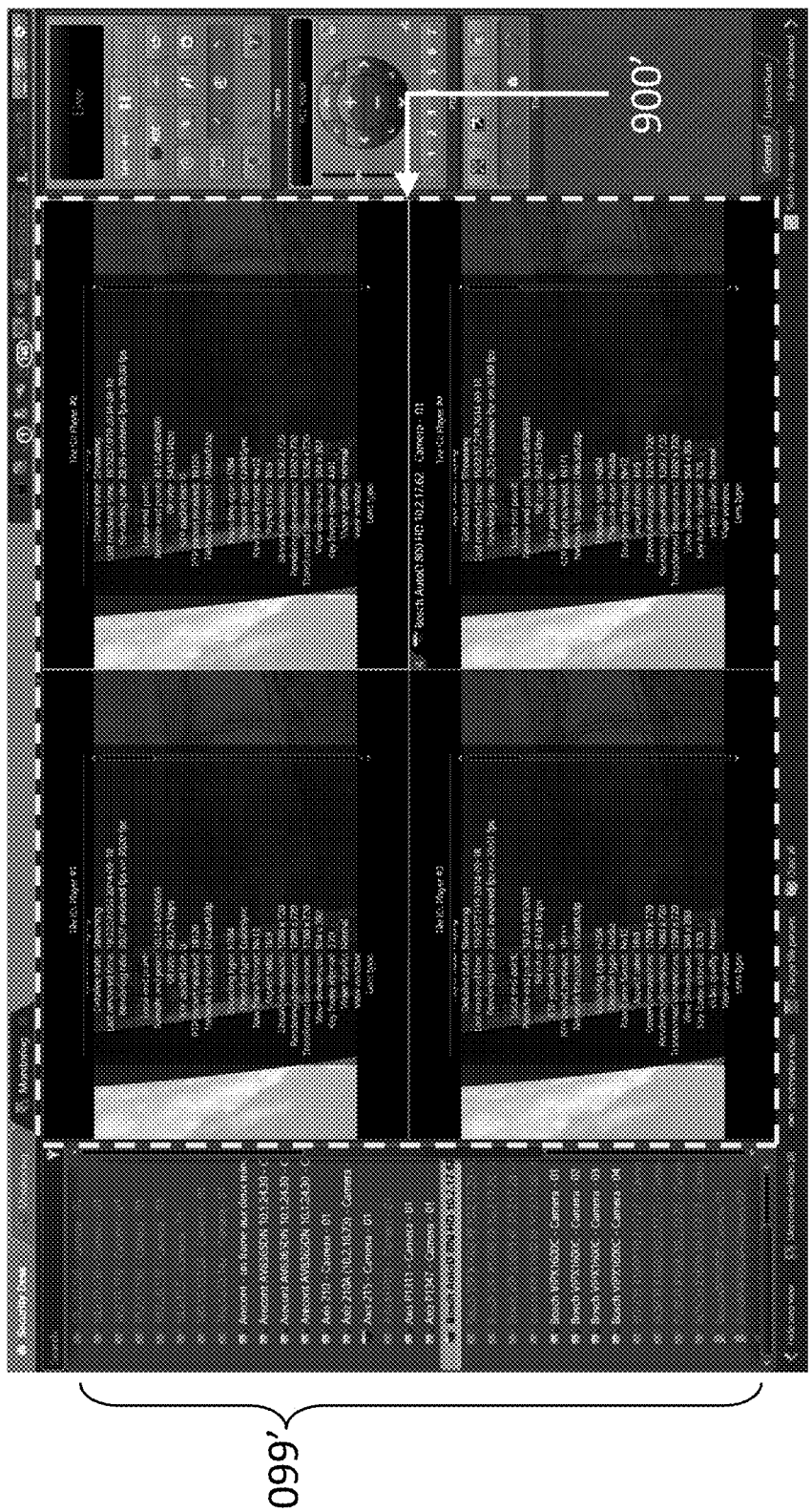
FIG. 6 is a screenshot of an example embodiment depicting a display management module showing a dynamic attribution of streams to different processing resources for decoding and display showing the specific decoder type resource used to perform the decoding for each stream.
Figure 7:
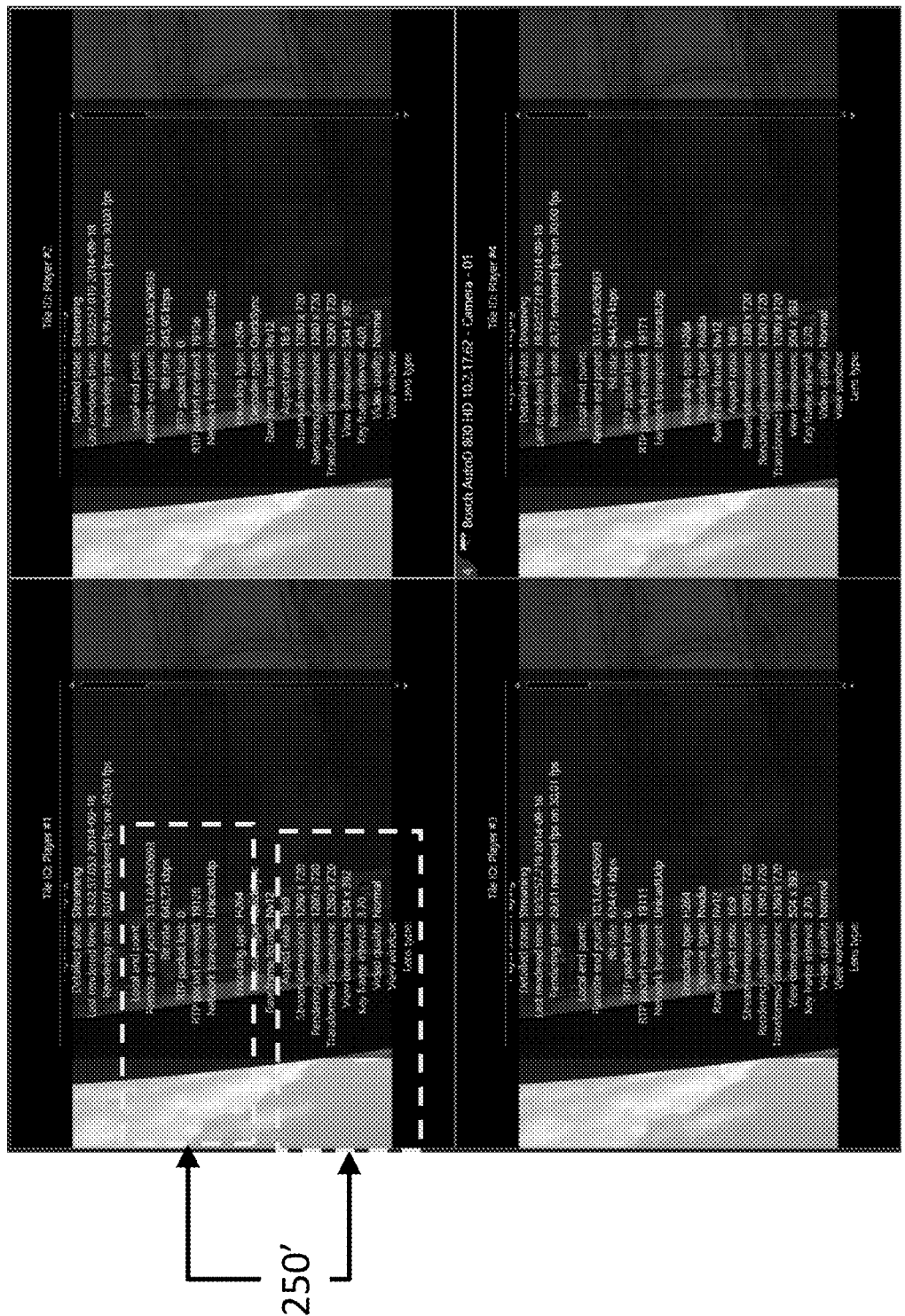
FIG. 7 is a screenshot of an example embodiment depicting a magnified view of example stream payload analysis results textually superimposed onto tiled windows with streaming feeds in a display management module.

For example, a finite number of stream input types known to some embodiments of the invention may be recognized in said embodiments through a parsing of corresponding streams' packet headers. In further embodiments, a detection algorithm may be present to arrive at a positive identification of streams through payload analysis of said streams (FIGS. 6, 7). In further embodiments, a combination of the foregoing (such as through executing various strategies in parallel or in a cascaded manner), in addition to any one or more supplementary identification schemes not discussed herein may be envisioned for purposes of ascertaining the type of stream(s) received. In still further embodiments, additional information consisting of specific details about said stream(s) pertinent to the processing, handling, and specific deployment objectives of said embodiments may likewise be sought, for example through one or more deep packet inspection and analysis schemes. As a non-limiting example, additional identification information sought regarding stream inputs 101, 102, 103 may include, in the case where said streams are video streams for instance, said stream inputs' framerate and resolution.

Of course, the broad input stream reckoning strategies presented above are not intended to be an exhaustive enumeration of all possible approaches that may be envisioned for all embodiments, but are merely a suggestion of certain strategies that may be envisioned for deployment. In still further embodiments, it is possible that a type or even a specific aspect of one or more input streams may not be positively or definitively identified at all; in such cases, said streams may be identified as such and an error handling approach suited to the deployment objectives of said embodiments may be executed. These may include, in some non-limiting examples, notifying or otherwise prompting a human operator for specific action, and attempting to proceed nonetheless.

In some embodiments, the stream detection engine 200 may be configured to have limited access to the input module 100 for purposes of detecting the type and other attributes of streams 101, 102, 103 received by said module 100. The stream detection engine 200 may likewise be configured, in certain embodiments, to inspect 150 the input module 100 with one or more reckoning strategies such as discussed herein at a specified interval. In other embodiments, the engine 200 may be configured to dynamically or asynchronously detect the addition of a stream 101, 102, 103 to the input module 100 and perform detection and query operations 1500$n$ the new stream added. Likewise, further embodiments where such stream detection and payload query operations 150 are carried out dynamically or asynchronously may be further configured to provide such detection abilities on an ongoing basis upon said media streams 101, 102, 103 for the entire time that said streams are available within the input module 100, rather than merely once. Multiple inquiries 150 of the streams 101, 102, 103 over the interval during which they are present within the input module 100 allow embodiments of the present invention to detect changes within the nature of a specific input media stream (including, but not limited to a change in a video stream's frame rate, resolution, color space), and allow other modules further discussed herein, to respond to such changes by modifying the behavior of the system as appropriate. In an embodiment of the present invention, an inspection and detection operation 150 may require or otherwise include a granting, to the stream detection engine 200, of proper mutual exclusion or access permissions through a synchronization mechanism of any one or more input media streams 101, 102, 103 prior to actual detection or parsing of any part of said streams.

In deployments, implementations of the stream detection engine can, for example, make use of the FFmpeg library's core functions/structures and utility functions to identify the nature of a stream available to the input module 100.

Following identification of a stream, the engine 200 generates a stream payload analysis result 250. The particular encoding standard and format of said analysis result 250 may vary in accordance with the deployment needs and scenarios of specific embodiments of the present invention. In some embodiments, a single result 250 at a time may be returned; in other embodiments, a series of such results collected over a given time interval may be compiled or otherwise merged and retained in accordance with a given condition or policy. In a related embodiment, said results retention (including, without limitation, number of individual records and the amount of time each is kept) may be configured as a parameter of the system, as discussed further herein. In a further embodiment, the analysis results 250 may likewise be requested or otherwise communicated in accordance with similar considerations and needs of said embodiment. As a non-exhaustive enumeration, the engine 200 may be configured in such a way as to communicate or share such results 250 once the detection operation for an individual stream 101 has completed, or once the nature and attributes pertinent to the respective embodiment of the present invention have been identified for a number of streams 101, 102, 103.

In another series of embodiments, particularly those in which rapid identification of some aspect(s) of input stream types is of particular or time-sensitive importance (such as in a mission-critical deployment scenario in which a large number of input streams is received by an embodiment of the invention in a short period of time), the specific record of a payload analysis result 250 may configured for various levels of granularity and to query and deliver certain aspects of the analysis result 250 deemed of greater importance before others. In such embodiments, for example, it might be necessary or desirable for an embodiment of the present invention to ascertain the video format, frame rate, and resolution of a particular stream input as a coarse means by which to arrive at a heuristic to assess and anticipate the processing load associated with said stream input 101. In said embodiments, returning such information prior to performing any deep packet inspection of said input's 101 bit stream to determine information deemed of secondary or lesser importance, is useful. A subsequent result 250 with greater or full granularity may be requested and provided subsequently and/or at a later time when less input module 100 traffic is received by an embodiment of the invention. In a further embodiment, a priority policy may be specified or configured such that additional or full information about one particular (or particular category) of stream may be provided in a result 250 before comparable information is compiled and/or ascertained by the engine 200 for another (category of) input stream.

In some embodiments, the stream detection engine 200 can be configured with information about the stream types supported by the system. In such embodiments, results record 250 may accordingly contain information specifying whether an incoming stream is of a type that is partially recognized or even entirely unsupported by the system, in which case corrective action (including but not limited to execution of the aforementioned error handling procedures) may be undertaken.

Operator Input Module

It will be appreciated that for various embodiments of the present invention, the modules discussed herein may accept configuration settings of various kinds to allow said embodiments to alternatively alter, adjust, vary, or simply set their behavior in accordance with the deployment objectives or scenarios of said embodiments. Such configuration settings, which may affect any one or all modules described herein, may be specified, in various embodiments, by one or even several human operators. In further embodiments, access policies or privileges may be specified to variously allow or restrict the specifying of some or all of the configuration settings available to said embodiments by specific users or, in still further embodiments, by categories of users.

Categories of users may include, without limitation, human operators of an embodiment of the present invention for whom a limited interaction profile has been specified. In an embodiment, such limited interaction may include access to or restriction from using any one or more of the modules described herein, whether in whole or in part. In a further embodiment, categories of users may include, to provide a non-exhaustive enumeration, system integrators, deployment professionals, human operator superusers, and system maintenance staff. Indeed, in a still further series of embodiments, the notion of "user" need not be limited to a human operator or other class of human individual with a specific level of access to any whole or part of the system; in such an embodiment, the notion of what constitutes a user may be extended to include an external non-human actor, such as a third-party computer program or related application programming interface providing partial or total access to one or more aspects of embodiments of the present invention. In a still further embodiment of the present invention, examples of human users might include law enforcement and security personnel.

Figure 8:
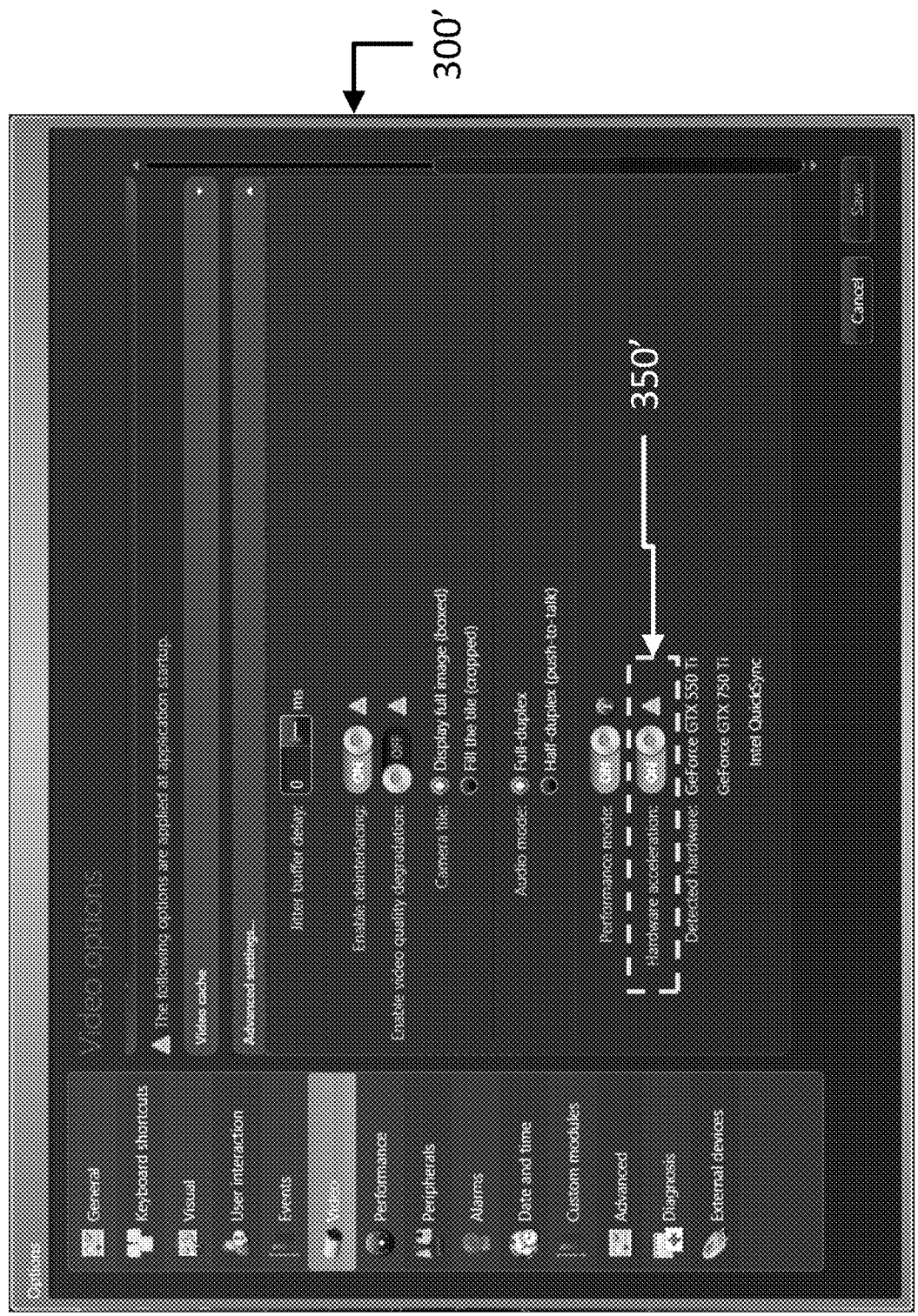
FIG. 8 is a screenshot of an example embodiment depicting a display management module of an operator input module, allowing a human operator to specify whether or not to use hardware acceleration resources to perform stream decoding.

In various scenarios, interactions between embodiments of the present invention and humans and/or external non-human actors may ultimately affect the operation of various modules of embodiments of the present invention. Nonetheless, it is convenient to visualize all such interactions as being received by or otherwise consolidated within a dedicated operator input module 300. Consistent with this conceptualization, it is from said operator input module 300 that configuration information and instructions 350 to embodiments of the present invention emanate. Such configuration and instructions 350 may contain key policy or function-specific parameters for the operation of embodiments of the present invention, and are further discussed herein. In particular, aspects of modules described herein as being configurable may for convenience be integrated or featured as (including but not limited to a graphical user interface, menu, submenu, or control panel) encapsulated within the operator input module 300 (FIG. 8). In another embodiment, the operator input module 300 may receive external input using any appropriate human interface device, such as a mouse, keyboard, or touchpad. In a further embodiment, such input may be received from a system or application external to an embodiment of the present invention, with said reception being implemented via any compatible message passing scheme known in the art.

In certain embodiments of the present invention, the scope of system parameters that may be specified via the operator input module 300 may be severely restricted or, in further embodiments, be entirely absent. In the latter case, such parameters may be independently specified within other modules described herein. In still further embodiments, said modules may be configured to operate in accordance with a contained set or finite number of combinations. In still further embodiments, such parameter selection may be carried out autonomously by the system's various modules, obviating the need for an operator input module 300 entirely. In such embodiments, parameters such as the maximum allowable load to place on one or more processing resources, further discussed herein, may be specified. Likewise, it may be expedient in further embodiments to specify, within the operator input module 300, additional policy pertaining utilization patterns of resources present to adopt or, in related embodiments, to prefer.

For example, in certain embodiments of the present invention, utilization policies for various processing resources 501, 502, 503, may include, without limitation, instructions 350 on whether to enable specific hardware acceleration capabilities (when such capabilities are present) as further discussed herein; such instructions 350 may be specified within the operator input module 300. In further embodiments, such instructions 350 may likewise include a list detailing the sequence of specific processing operations to perform on input streams 101, 102, 103.

In still further embodiments, portions of such instructions 350 may be received from one or more modules external to an embodiment of the present invention and routed through the operator input module 300 before being issued and applied to the system. In still further embodiments of the present invention, an optional display management module 900, further discussed herein, may alternatively or complementarily receive said portions of said instructions 350 before routing the latter to an implementation of the operator input module 300.

In further embodiments yet, a user can visually assess and specify, within an implementation of the operator input module 300, which media stream 101, 102, 103 contained within and corresponding to a specific tile within a display 900 (further discussed herein) has encountered a decoding or other processing malfunction, error, or failure. The user can in implementations be provided with interface controls to manually identify the tile in which a malfunction has been observed. As a result of such identification, corrective or recovery action can be taken. For example, a failure involving a decoding operation for a specific stream 101 using a specific processing resource 501 can be recovered from. In such a scenario, a monitoring workstation can, further to the foregoing user identification, implement a mechanism by which a recovery of the stream 101 and failed processing resource 501 can be attempted, such as by diverting processing to a different processing resource 502. In a still further implementation, the specific processing resource 502 to which to divert processing can be specified by the user via an interface provided by the operator input module 300.

Recovery following a resource crash can thus consist of four broad steps.

The first of these consists of detecting that a recoverable error occurred in a given resource, such as a hardware decoder. Such detection can be provided in the form of software or API-based reporting capabilities of the resource itself, or via an external observation or inquiry made of a resource. The second step consists of substituting a failed or failing resource (such as a GPU-based hardware-implemented decoder) with a more robust and operational resource (such as a CPU-based software-implemented decoder) available within the resource pool 500. It will be appreciated that such a substitution should be carefully carried out so as to minimally impair the operation of any other aspect of implementations described herein. It will be appreciated that in certain scenarios, image frames exiting a newly substituted software-implemented processing resource might require additional substitution of subsequent or related processing steps. This might happen, for instance, in cases where processing consists of decoding as well as rendering steps. In such cases, as software frames exit a newly-allocated software-based decoder, the previous hardware-based renderer is likewise substituted with a software-based renderer. In the meantime, the crashed or problematic hardware decoder is quarantined and terminated once processing has been safely assigned away from it. It will be appreciated that even in cases where GPU-based resources (e.g. decoders) are robust with respect to potential packet and/or frame loss, driver errors can prove particularly difficult for security system video monitoring workstations involved in processing and displaying large numbers of streams to recover from.

In the foregoing scenario, the crash recovery mechanism is said to be seamless because the software decoder thus substituted immediately resumes processing duties where the hardware decoder left off. From a user standpoint, such a switchover represents a minimal interruption, as video playback can in many cases be imperceptibly affected. From a deployment- or implementation-centric perspective of monitoring workstations*, it will be appreciated that in the absence of control over stream parameters of input media streams 101, 102, 103 in addition to processing resource implementations themselves, crash recovery operations as described herein can prove particularly useful.

Resource Monitoring Engine

It will be appreciated that in certain embodiments of the present invention, it is advantageous to dedicate a module to monitor the state of processing resources 501, 502, 503 available 500 to the system overall. The pool of processing resources available to embodiments of the system 500 are mentioned in the present section merely for contextual relevance; they 500 are discussed in further detail and within a more dedicated section herein.

It will be further appreciated that rigorous monitoring of such processing resources 500, 501, 502, 503, is appropriate and indeed useful in high performance or mission critical embodiments. In particular, combining such monitoring with a feedback reporting and a corresponding reaction mechanism—in cases where these are needed or desirable, renders the implementation all the more robust and valuable. The foregoing considerations provide a compelling impetus for at least certain embodiments of the present invention to include a resource monitoring engine 400. While the various functions of such a monitoring engine 400 may in certain embodiments be contained within an explicit and dedicated module, it will be further appreciated that such functions might, in other embodiments, be limited or otherwise encapsulated within other modules of the system or in still further embodiments be entirely absent.

Figure 9:
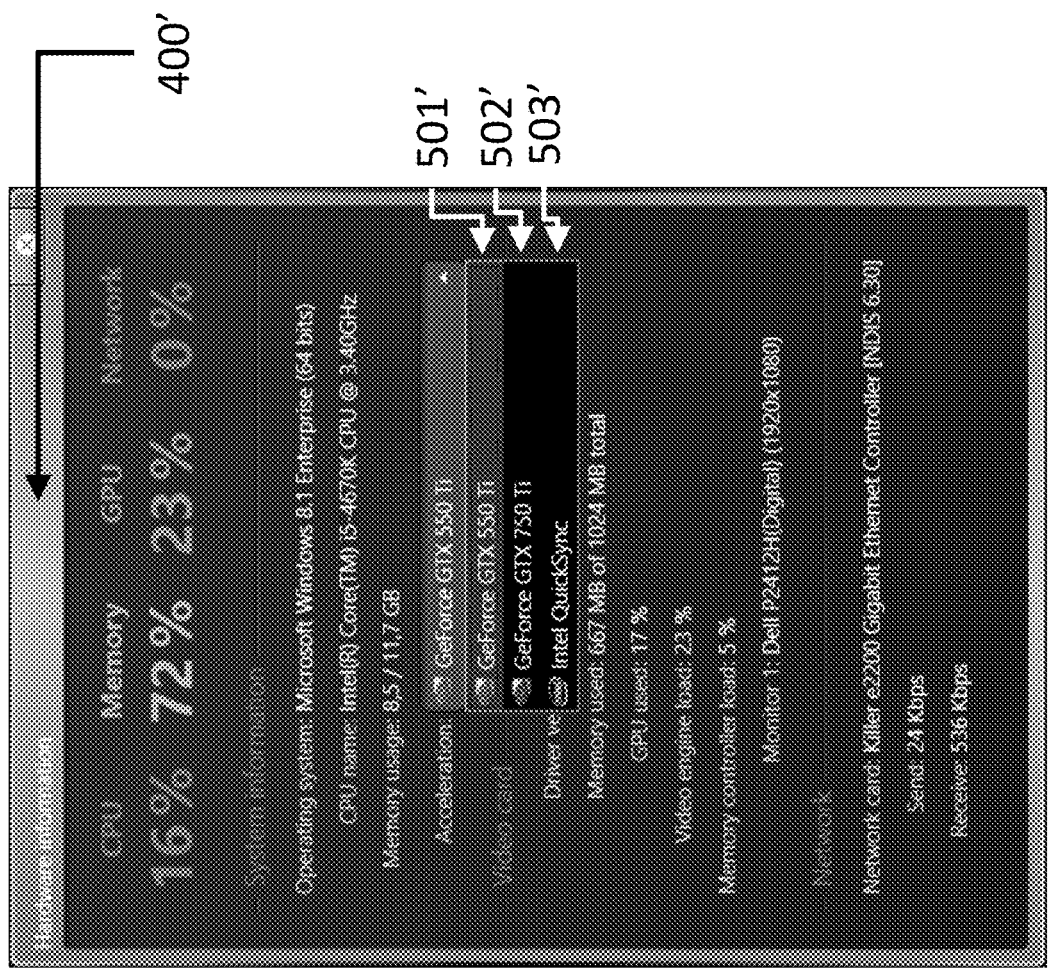
FIG. 9 is a screenshot of an example embodiment of a hardware acceleration resource monitoring dashboard which may form a part of the resource monitoring engine in embodiments of the present invention.
Figure 10:
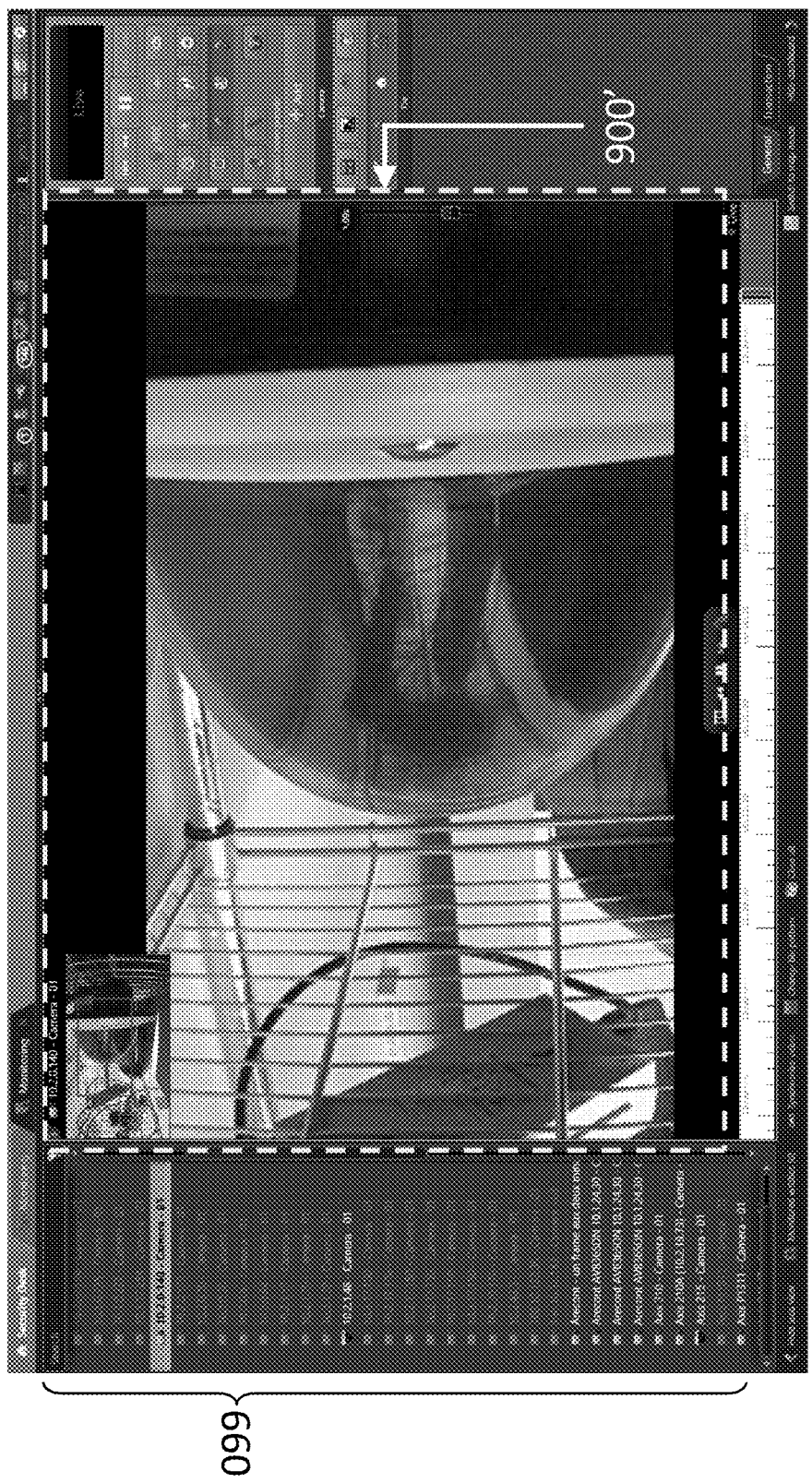
FIG. 10 is a screenshot of an example embodiment of a scaling processing task performed using an embodiment of the present invention.

In embodiments where it is present, the resource monitoring engine 400 monitors 450 the load of the processing resources 501, 502, 503 that make up the processing pool 500 of said embodiments of the present invention. The nature of such monitoring, including but not limited to the frequency with which it occurs and indeed the granularity of the usage analysis to perform, may vary in accordance with the specific objectives and deployment scenario of each specific embodiment of the invention (FIG. 9).

In certain embodiments, monitoring 450 of the resource pool 500 may likewise follow a custom and non-uniform policy for the entirety of resources 501, 502, 503 contained within the resource pool 500. For example, one processing resource 501 may be subject to a load monitoring 450 policy or even specific load reporting requirements that may differ from those of 502. In various embodiments of the present invention, such differences may include, without limitation, the frequency with which each one or more resources is monitored, the type, category, or specific name of the processing operation done by each at the time at a given moment, in addition to any other statistical information (including but not limited to active time, disk usage, or other performance metrics) deemed valuable for the specific scenario and purpose in which said embodiments are deployed.

In a further series of embodiments, the load monitoring information 450 may be stored within the resource monitoring engine 400 until said engine 400 is queried for such information 450 in a manner analogous to that seen in the stream detection engine 200. In a still further series of embodiments, the resource monitoring engine 400 may be configured to retain such information in accordance with a given criteria set, such as a specific period of time. In such embodiments, the resource monitoring engine 400 may store such data while the engine 400 awaits a resource utilization data query 640 from the system's attribution module 600, the latter of which will be further described in a subsequent section herein. Nonetheless, said attribution module 600 receives the aforementioned stream payload analysis result 250, the system configurations and specific operational instructions 350, in addition to completing a resource utilization data query 640, all in an effort to generate an overall directive to dictate and manage processing to be carried out by the system.

In a related series of embodiments, in the course of monitoring 450, the resources 501, 502, 503 may be polled for their status or for details regarding their operation, with the result of such polling being communicated back to the resource monitoring engine 400. In a further series of embodiments, specific policies on said polling and any related monitoring activity 450 may be specified as part of the configuration information 350, the latter of which is indirectly shared with the resource monitoring engine 400 by the attribution module 600 in the course of a resource utilization data query 640 that the latter 600 issues to the former 400. In a further related series of embodiments, the result of such polling 450 may be compiled by the engine 400 into a matrix or matrix-like series of data which matches the resource 501, 502, 503 with any number of load and/or performance parameters and with tasks currently occupying the aforementioned resources, with said resulting matrix forming the basis of the resource utilization data query 640 provided to the attribution module 600 by the engine 400. It will be appreciated that the information populating the aforementioned matrix and delivered to the attribution module 600 may likewise deliberately constitute a limited or partial (rather than integral) set of data available. Such limitation might, in a manner analogous to that discussed previously for stream detection, be desirable in embodiments or even in specific operational situations in which a specifically defined minimal and/or rapidly collected quantity of information are sufficient for use by the attribution module 600.

Likewise, the ability of the resource monitoring engine 400 to statically or dynamically monitor 450 the operational health and status of any one or more processing resources 501, 502, 503 within the resource pool 500 can prove particularly useful. In particular, such monitoring 450 can be advantageously exploited to detect a processing error or a failure in a specific processing resource 501, 502, 503 within the resource pool 500 and contemporaneously allocated to a specific input media stream 101, 102, 103.

In another series of embodiments, the resource monitoring engine 400 may be entirely absent by design. In such cases, no load monitoring of the resource pool 500 need be done 450 or accordingly queried 640. Such embodiments may typically be implemented in situations and/or on systems characterized by such a conservative usage policy of resources present in the processing pool 500 as to obviate the need for such monitoring capability.

Resource Pool

It will be appreciated that embodiments of the present invention require the ability to process data commensurate both with the streams 101, 102, 103 received 099 as inputs 100 as well as the desired processing operations to perform. Accordingly, it is convenient to contemplate the processing ability of embodiments of the present invention as a resource pool 500 comprising any of several identical or distinct processing resources 501, 502, 503. Said resources 501, 502, 503 may be processors of any kind, and accordingly need not be constrained to any one type or technology. The resource pool 500 may be made up of any number of processing resources 501, 502, 503, each having any microarchitecture and electrical layout operative to permit the processing tasks required for scenarios in which the various embodiments of the present invention will be deployed. Thus, in various embodiments, said processing resources may be one or more general purpose CPUs, including but not limited, in at least one embodiment, to the one or more CPUs on which the present system executes. The processing pool may likewise comprise, for any one or more embodiments of the present invention, one or more GPUs, ASICs, DSPs, physics processing units, image processors, network processors, audio processors, or any other processing means 501', 502', 503'. Indeed, such processing resources may include GPUs for video processing, particularly for use in compute-intensive processing operations and for purposes which include freeing the CPU for other tasks. For example, GPUs running the Maxwell microarchitecture can be envisioned as constituting one of several possible desirable GPU-based hardware processing resources among those found in the resource pool 500. These can further be of a type compatible for use with the CUDA application programming interface for general purpose processing.

For their part, GPUs provide two broad types of resources of particular interest to embodiments described herein. One type of such resources is the array of programmable cores, referred to in documentation by NVIDIA as "CUDA cores" and as "shaders" in Direct3D documentation. Such programmable GPU cores correspond to a processing resource having a large amount of cache and a very large number of slow and unsophisticated cores as compared to a CPU, or even an FPGA. On the other hand, GPU cores can advantageously and repetitively execute a simple processing task, such as computing the color of every pixel of the screen, a very large number of times. This contrasts with the advantageous abilities of CPUs, which excel at complex branching logic. A second type of resources procured by GPUs is purpose-built hardware dedicated to decoding a range of specific video compression formats, such as H.264 and HEVC.

Resource vendors, typically but not necessarily the hardware device manufacturers, provide and implement application programing interfaces (APIs) as discussed herein to access the aforementioned processing functionality.

Such vendors typically provide and implement certain APIs for accessing this functionality from software. Accordingly, some APIs are defined and published by the hardware manufacturer (such as CUDA, NVCUVID and NVAPI), while some can be defined by an external entity but implemented by a different manufacturer (such as Microsoft's Direct3D or DXVA).

The Applicant has further determined that decoding functionalities enabled by various general-purpose decoding libraries available for execution on a CPU platform are particularly desirable in this context because of the comparatively robust operation that they provide. The libavcodec encoding/decoding library included within the FFmpeg free software project is one such example. In particular, such decoding libraries, by virtue of their comparatively lengthy development history and breadth, typically provide significant resilient operation in the event of departure of a stream from an established standard. This contrasts with decoding libraries typically available and designed for execution on a GPU platform. Nonetheless, even the FFmpeg project, for instance, provides a subsystem to enable acceleration using hardware devices. The latter makes it possible to use specific devices (including GPUs) to carry out multimedia processing. Furthermore, various acceleration API implementations are available including those enumerated at <https://trac.ffmpeg.org/wiki/HWAccelIntro>. Likewise, when the processing abilities of said processing means other than the central CPU of a workstation are exceeded, a portion of the workstation's own CPU's load may in some embodiments be procured to provide surplus processing capability to meet said demand. Other processing operations may include decompression (whether as part of or separate from a generic understanding of decoding), image scaling, as well as any other processing task.

It will also be appreciated that in embodiments of the present invention, the processing resources present should possess the specific capabilities necessary to perform the processing operations required by the system. For example, whereas typical surveillance cameras provide a framerate in the vicinity of 30 fps, security walls and their often underlying security system video monitoring workstations are required to support cameras outputting a framerate closer to 120 fps, as isolating cases of cheating by way of sleight of hand, in addition to broader security requirements, constitutes a relevant and pertinent preoccupation.

To determine whether resources present in the resource pool 500 are adequate for use in a given scenario, an inventory of the capabilities of the resource pool as a whole 500 and/or of its constituent resources in particular 501, 502, 503, may be queried and listed in the course of operation of an embodiment. Such an inventory of resources' capabilities can be obtained, for example, by inquiring the hardware and software using appropriate API function calls or via an equivalent process such as deploying a specific test case consistent with a use-case to validate. Such resources as codecs native to one or more particular libraries, such as FFmpeg, or NVIDIA's CUDA, in addition to external library wrappers, and software components for bridging said libraries to accelerating hardware can populate the resource pool 500.

Capabilities thus inventoried and enumerated should likewise be understood. In a further embodiment, such capability inventory information may be coupled and integrated with error handling routines equipping said embodiment to gracefully recover from cases where an input media stream or processing task cannot be carried out by said embodiment for lack of able processing resources (including but not limited to absent media codecs), inadequate licensing, or due to any other limitation. In embodiments of the present invention in which a resource monitoring engine 400 is present, the result of such capabilities inquired of the resource pool 500 may be included within the load monitoring information 450 inquired by said resource monitoring engine 400, and subsequently provided by said engine 400 to said attribution module 600 as part of a resource utilization data query 640.

In a further implementation, the resource pool 500 can be configured, as further described herein, to allow for a shifting of processing away from one principal resource type and toward another. For example, a toggling, or even a permanent switching away from GPU or dedicated hardware (using, for example a CUDA-controllable resource) to CPU or general purpose hardware (using, for example, an FFmpeglibavcodec resource) is envisioned.

Such a processing changeover, for example, from a specialized or general-purpose hardware-based resource (e.g. GPGPU) to a CPU-resident resource, can provide a particularly desirable alternative processing means in cases where stream parameters or encoding particularities for a specific input media stream 101 change. Such stream parameter or encoding changes are for the most part unexpected and unwelcome. Furthermore, in certain implementations, they can prove particularly unwelcome to a security system video monitoring workstation on which a large number of streams containing encoded or compressed video are processed. This is especially the case when such parameters change in the course of streaming or transfer of a stream 101 itself, as when the stream 101 transitions from a fully standards-compliant encoding to a noncompliant (or to an otherwise substandard or lax) adherence to a particular encoding specification.

In such cases, a GPU-based resource is typically unable to properly carry on the processing tasks a stream whose encoding parameters change mid-stream in an uninterrupted and seamless manner. This often flows from GPU libraries' tendency to be of a closed and proprietary nature, which in turn impacts on such libraries' more sharply delineated and highly specific functionality. In such cases, the specific processing resource utilization configuration previously specified by the routing command 650 in place is no longer adequate to successfully carry out the intended processing. Accordingly, and further to the dynamic and unexpected change in streaming parameters, the resource previously attributed by the foregoing routing command 650 is caused to crash or otherwise terminate unexpectedly. In such instances, a means by which to recover from the preceding incidental and dynamic change in stream parameters is required. It will be appreciated that any resource or resource-related component can be afflicted with a crash. In a GPU use-case, for instance, a resource crash can occur because as a result of any number of various independent issues. For example, a physical component on the GPU board itself can fail, a driver there attached can fail, or the decoding library (or other on-board processing resource) can likewise fail. In addition to such sources of potential crashes, changes in stream parameters such as resolution, colorspace, compression type, or encoding can likewise cause a resource— unable to handle such changes—to crash.

It will be appreciated that in many deployment scenarios, such a resource crash recovery mechanism must operate in a manner affecting the processing (e.g. decoding) of the offending input media stream 101, and accordingly the operator or user experience, either minimally or as seamlessly as possible. In contrast with the foregoing often proprietary hardware-specific processing libraries having limited scope, a reattribution of the offending input media stream 101 as rapidly as possible to a more robust and CPU-based processing resource 502, can prove invaluable in such cases. Furthermore, it will be appreciated that allocating additional CPU cores within a resource pool 500 in implementations where a crash recovery mechanism involving diversion from GPU-based resources to CPU-based processing resources can improve performance and overall robustness of the crash recovery mechanism itself. This is largely because additional cores can mitigate possible oversaturation of resources, particularly those whose operations mutually parallelize with little difficulty.

It will however be appreciated that contingencies in the event of failures of CPU-based processing resources should in implementations likewise be envisioned. It is possible, for instance, for a software-implemented decoding resource to crash for reasons either similar or entirely different from a possible hardware-implemented counterpart.

In deployments in which error recovery for decoder components or other processing resources is present, a crash recovery mechanism can be implemented by way of code to execute on the CPU. Such code can include algorithms by which a decision as to which resource(s) should be used to carry out a specific processing task. Furthermore, the algorithm can include measures by which to transition to various resources, such as when either the driver API returns an error code, or alternatively when some abnormal behavior is detected (such as when a resource remains in an indefinite state for an extended period of time). While it can technically feasible to implement them within one or more GPUs, it will be appreciated that in implementations, all of such recovery mechanisms or portions thereof—including resource allocation, execution, monitoring/detecting possible error conditions, and deallocation—can advantageously operate on one or more CPUs. Thus, as specific details pertaining to GPU implementations of resources can remain opaque to implementers of embodiments described herein, decisions can be made by algorithms based on the CPU, with API calls implemented by the driver 530.

It will be further appreciated that the individual processing resources 501, 502, 503 that make up the resource pool 500 may, in various embodiments of the present invention, benefit from being mutually accessible resources. In such cases, mutual accessibility is beneficial, as it facilitates sharing or otherwise directing the outputs of one processing resource 502 toward the inputs of another processing resource 503. Such resource accessibility provides a wide array of potential resource sharing policies. In a further embodiment, a more complex resource accessibility policy may be defined or configured to variously restrict, encourage, optimize, or limit the use of any one or more processing resources 501, 502, 503 in accordance with the scenario in which said embodiment is deployed.

The deployment of certain resource sharing policies to the resource pool 500 may effect—whether implicitly or explicitly—aloud balancing policy. Indeed load balancing may constitute, in at least certain embodiments of the present invention, a key benefit. More sophisticated load balancing policies may encourage the attribution of processing tasks to any one or several processing resources 501, 502, 503. In an embodiment where a processing task to perform is the result of several independent (or at least divisible) subtasks, such execution decisions as splitting, forking, or merging portions of data among multiple resources 501, 502, 503 may be envisioned. In a further embodiment, and particularly in cases where processing urgency, priority or other time-sensitive considerations are of primary importance, a processing load may be may be assigned, to the greatest possible extent, among multiple resources 501, 502, 503.

In a distinct scenario, a processing error or failure using a specific resource 501, including but not limited to a GPU-based codec, can occur. Numerous possibilities of failure or crash of any one or more resources within the resource pool 500 are possible. In implementations, these may be inquired using the inquire capabilities of any one or more component libraries' software API function calls. Likewise, a driver 530 or operating system bug, data corruption, or an unguarded attempt to instantiate too great a number of resources on the GPU can cause the failure or crash of other resources. The occurrence of such errors, particularly in mission-critical environments, can occasion the need for a rapid recovery whereby such processing is taken over by a CPU-based processing counterpart instead as described herein. Specific crash recovery strategies can be elaborated, particularly when previous crash heuristics are known or are otherwise available. For example, if a particular compression or encoding format observed or detected within a stream is known to trigger or otherwise cause a crash of a particular (e.g. GPU-based) processing resource 501, such as a video decoder, as well as a more robust (e.g. CPU-based) processing resource 502, also for video decoding, strategies such as skipping decoding one or more image frames with such a compression type or encoding format can be skipped, or some other exception handling routine can be triggered. It will be appreciated that a particularly verbose API library with comparatively exhaustive inquiry capabilities can prove invaluable both in identifying such operational anomalies, as well as in handling recovery operations thereafter.

Once a result is yielded by a processing resource 501, 502, 503, said result may in some embodiments be made readily available externally 999. The possible nature of such results is to be appreciated here in a large and widely encompassing manner. Processed results may be understood as being, in a non-limiting enumeration, numerical values, images, or any portions of partially or fully decoded video.

In another embodiment, data generated or otherwise output by one or more individual processing resources may be in a raw output form relative to said data's final purpose. In such cases, said result data may likewise not be in a usable, contextually intelligible, or otherwise useful form. In such an embodiment, it may be preferable to await the availability (from within the resource pool 500 and/or without) of all contextually relevant results before undertaking an encapsulation process appropriate to the deployment scenario of said embodiment. Said encapsulation process (including but not limited to activities involving or relating to stream encoding and/or transfer encoding) may occur, in some embodiments, subsequent to the production of said raw outputs and entirely within said resource pool 500. In other embodiments, portions of said encapsulation may occur partially or entirely external to the resource pool 500. In a further embodiment, a variable approach to such raw output data form may be envisioned.

Individual processing resources 501, 502, 503, or indeed the resource pool 500 collectively, may communicate with the resource monitoring engine 400 in embodiments in which the latter is present. When the resource monitoring engine 400 is absent, the resource pool 500 communicates with the attribution module 600. Discussion of aspects regarding the assignment of a processing load is further made in the attribution module 600 section herein. Likewise, discussion of aspects regarding stream and/or transfer encoding is further made in the output module 800 section herein.

Attribution Module

Before execution of the main processing steps can begin, embodiments of the present invention must bridge the input data received with the capabilities of processing resources present. As discussed in the previous sections, this coordination endeavor requires several steps.

Once the input media streams to process have been received by the input module 100, and their nature has been ascertained, as well as the specific system configuration and particular instructions with which to operate, in addition to a due characterization of the processing resources and information about their suitability for the processing tasks has been obtained, embodiments of the present invention may proceed to assign the necessary processing tasks to the processing resources present. For example, the FFmpeg decoding library's avcodec_find_decoder( ) and avcodec_find_decoder_by_name( ) functions can prove useful in locating specific decoders to decode specific input streams 101, 102, 103. Such codecs may non-limitingly include those enumerated at <http://ffmpeg.org/doxygen/trunk/group__lavc__core.html #gaadca229ad2c20e060a14fec08a5cc7ce>.

This dynamic sets forth the motivation for the major decision-making component central to embodiments of the present invention. The role of the latter component, more abstractly referred to as the attribution module 600, balances the operational and processing needs of incoming data with the system's ability to accommodate such processing with little perceivable delay. In embodiments of the present invention, the tangible result of such decision-making is the determination of one or more routing commands 650 which express the explicit association of available resources 501, 502, 503 to input streams 101, 102, 103 to process. The determination of said routing commands 650 is typically an ongoing exercise that in a further embodiment of the invention takes into account a collection of elements that includes knowledge of the precise nature 2500ƒ the demand 100 and supply 6400ƒ all available processing resources 500, in addition to externally articulated policy 350. Likewise, in a further embodiment of the invention, the generation and issue of a routing command is the result of the aforementioned elements effectively cooperating as a control system to both respond to and govern the system's processing needs.

As discussed previously herein, in various embodiments of the invention, the input module 100 typically contains a changing number of input media streams 101, 102, 103 as these are variously received and subsequently handled by the system over time. Determining the individual nature of said streams 101, 102, 103 (including, for example, type, framerate, and resolution) is one of several important elements in the generation of a routing command 650. This is particularly due to the fact that various resources may be present in embodiments of the present invention, with each of said resources being suited to a finite number of processing tasks typically required by the various streams in the input module 100. The aforementioned determination of stream type is one important piece of information to be considered when deciding which one or more available resources 500 are best suited to handle which stream 100. In a further embodiment of the present invention, the attribution module 600 may compile stream type information consisting of stream payload analysis results 250 received for streams in the input module 100 over a given period. While a format intelligible to said embodiment is sufficient, said compilation may in a further embodiment take the form of a list of stream type information 601. In another embodiment, such information may require standardization (including but not limited to XML validation) following collection prior to being rendered intelligible, standardized, and usable.

Likewise, the attribution of resources 500 to input streams 100 may be subject to a similar approach in which said resources' 500 capabilities—both in terms of technical suitability for a given processing task as well as their temporal availability to carry it out—are monitored. The recurrence or precise period of such monitoring may vary in accordance with the scenario and implementation requirements of embodiments of the present invention. Said suitability and availability are among the basic information requested and returned in a resource utilization data query 640. The attribution module 600 may likewise include a pair of modules to manage and implement said resource utilization data query 640; in a further embodiment, a resource query module 607 may manage all such queries 640 made to the resource monitoring engine 400, while information correspondingly received from such queries may be periodically collected in a resource table module 602 for further consideration by the attribution module 600. It will be further appreciated that, owing to the changing operational loads of various resources in the pool 500, the resource query module 607 may in various embodiments issue a query 640 in fairly regular time intervals.

While the resource monitoring engine 400 and its associated monitoring 450 and querying 640 (607) activities may be explicitly absent from some embodiments, the resource table module 602 may in such embodiments be adapted to include complementary information as the maximum number of streams that each resource 501, 502, 503 may be permitted to accept at any one time, with said resources' busy/free status gleaned not through polling or other observation, but instead deduced through calculation. This latter scenario may be encountered in a further series of embodiments, particularly mission critical environments in which conservative attribution of resources is a key consideration, or in other implementations in which resource utilization follows a fairly predictable pattern of input stream 100 traffic.

In a manner analogous to the standardization previously discussed with regard to the stream type information 601 listing, the input configuration and instructions 603 received, typically from the operator input module 300 when it is present, or from any other external source with requisite privileges, may likewise undergo a similar validation process to ensure that their contents as expressed are intelligible to the attribution module 600. In a further embodiment, the attribution module 600 may be equipped with an instructions parser 608 to ensure that any translation required, such as between a third-party human interface device and/or other user interface module which may form a part of the input module 300, is performed before input configurations and instructions 603 are provided to the comparator 604—the main decision-making module within the attribution module 600—whose components and operation will be discussed presently.

In various embodiments of the present invention, the comparator 604 receives the stream type info 601, in addition to data from the resource table module 602, and the input configuration and instructions 608 to formulate a decision as to which input stream 101, 102, 103 to assign to which resource 501, 502, 503, with said assignment ultimately formalized as a routing command 650. Each of the former elements 601, 602, 608 supplied to the comparator 604 originates in some form from the environment in which an embodiment of the invention operates, and for this reason such elements may collectively be appreciated as operational stimuli. To ensure that decisions by which input streams 100 are matched with processing resources 500 deemed optimal for a given implementation or scenario, embodiments of the invention apply a series of weightings to various raw operational stimuli which may vary with time. The routing command 650 to generate thus follows an ongoing statistical analysis of specific qualities and quantities contributed by said operational stimuli. In a further embodiment of the present invention, such statistical analysis may include the application of fuzzy logic to various operational stimuli. In a still further set of embodiments, said numerical values may additionally feature, for at least some parameters, basic or default set points or default/reference values.

In certain embodiments, the input configuration and instruction scores calculator 610 assigns numerical weights to certain input configuration and instructions 350, 603 received and duly interpreted (in scenarios and/or embodiments where such interpretation is necessary) for said embodiments by the instructions parser 608. Such numerical weightings provide a quantifiable measure of the importance, usefulness, relevance, severity, and/or priority to assign to specific types of configuration information or operational instructions. In a further embodiment, said weightings may be at least in part assigned as a consequence of a set of artificial intelligence algorithms. In an example embodiment, the severity and priority to provide to an emergency stop command issued by an operator may thus take precedence over another setting whereby said embodiment is set to normally prefer a hardware processing resource configuration, which may in turn have higher priority than a specific system preference for one of two otherwise identical resources during minimal load periods. In a further embodiment, the scores assigned are at least partially the result of a previously-specified qualitative or quantitative value (or a set thereof), said value(s) specified to said embodiment. Said value(s) may be specified through such channels as an operator-accessible interface or by personnel responsible for deployment or maintenance of an embodiment of the present invention. In a further embodiment, multiple aforementioned weightings may be combined via or during operation of said instructions scores calculator 610. In a still further embodiment, said values may be grouped into like-themed categories, either explicitly by deployment personnel, or through an algorithm present within the input configuration and instructions scores calculator 610 itself.

In various embodiments, a similar weighting, score calculation and attribution approach may be applied by the stream scores calculator and sorter 612 to the stream payload analysis result 250 subsequently converted into stream type information 601. Such quantification may be useful, for example, in cases where incoming streams to said embodiments require or otherwise benefit from ranking or similar quantification for purposes of determining or extrapolating operational considerations such as the respective priority to assign to an input stream 101, 102, 103, or an optimization heuristic to apply which may be a function of the amount of data to be processed (which may in turn depend on framerate and/or resolution). Said quantification is, in various embodiments, partially a result of scores—and which may specifically concern or otherwise incorporate weightings regarding input instructions/configurations and streams—the latter of which may be calculated, result from, and received from the input configuration and instructions scores calculator 610. For example, stream type info 601 supplied to the stream scores calculator 612 might reveal that a specific input stream 101 has a specific framerate which might exceed some maximum threshold permitted by previously specified input configuration and instructions 603. Accordingly, said maximum threshold may be weighed for relative importance and consideration and be given a particularly high score by the input configuration and instructions scores calculator 610. Furthermore, the stream scores calculator might provide a weighed value for said stream 101 indicating that said stream's framerate should be subsequently throttled or minimized in a later processing stage.

Likewise, the aforementioned weighting and quantification done by the stream scores calculator and sorter 612 may further be particularly valuable in in the absence of explicit instructions, whether externally supplied 603 or parsed 608, regarding the handling of specific input streams. The stream scores calculator and sorter 612 may, in a further embodiment, calculate values which may complement or otherwise supplement those values originating from the stream type information 601. In a still further embodiment, said scores may be operatively combined with an artificial intelligence algorithm and be calculated, recalculated, and recombined to on an ongoing basis. Once weighted values have been assigned and associated to the supplied stream type information 601, the module's 612 further ability to prioritize the needs or one or more operationally relevant particularities may in a still further embodiment prove valuable. It will be appreciated that continual review, recalculation, and updating of said data 612 may be particularly useful in embodiments where rapid and/or numerous changes in the input module 100 are typically observed. Moreover, values for which a weighting is calculated or assigned may be grouped into like-themed categories, either explicitly by deployment personnel, or through an algorithm present within the input stream scores calculator and sorter 612 module itself.

In a manner analogous to the foregoing, a similar weighting, score calculation and attribution approach may in various embodiments be applied to results of a resource utilization data query 640 further and intelligibly converted and compiled in the resource table module 602. As was the case previously, the resource scores calculator and sorter 614 may receive scores calculated by the input configuration and instructions scores calculator 610 and which are of particular concern or consideration to the attribution of processing resources. For example, a previously-specified 603 preference for hardware processing resources received from the set of input configuration and instructions scores calculator 610 may be further combined with knowledge of the busy/free status of all (or specific) hardware resources by the resource scores calculator and sorter 614. Further to such combination, a further score may be complementarily calculated; in this case, the weighting expressed by said score would advantage specific hardware resources rather than otherwise equivalent software ones. It will likewise be appreciated that in accordance with the changing utilization and operational loads of the various resources in the pool 500, the determination of said scores by the resource scores calculator 614 would, in a manner analogous to aforementioned score modules 610, 612 be undertaken and accordingly refreshed at intervals compatible with deployment and operational scenarios of respective embodiments of the present invention.

Additionally, and in a manner akin to the two previously described modules, parameters for which a weighting is calculated or assigned may be grouped into like-themed categories, either explicitly by deployment personnel, or through an algorithm present within the resource stream scores calculator and sorter 614 module itself.

The two broad parallel weighting and score calculation processes just described—namely those involving, on the one hand, the input scores calculator FA and the stream scores calculator 612, and the input scores calculator 610 and the resource scores calculator 614 on the other—implement a weighting attribution and first-round prioritization process involving their respective operational stimuli. This cascaded score computation follows the importance of determining the course of operation of embodiments of the present invention as a function of input supplied by human operators and/or deployment personnel while simultaneously subjecting said operation upon a current view of said embodiments' processing capabilities and raw processing needs. Once the scores and weightings based on operational stimuli for input streams 101, 102, 103 to handle 612 and available resources 501, 502, 503 with which to handle said streams 614 have been independently determined, the two sets of scores are brought together in the scores comparator and merger 616 module.

It will be appreciated that the two homologous sets of weightings provided 612, 614 represent statistically optimal rankings for the specific scenario in which an embodiment of the invention is deployed. Thus, the weightings and scores emphasizing the processing needs of input streams are blended with weightings and scores emphasizing the available processing capabilities with which to handle said streams. In a further embodiment of the invention, the scores comparator and merger 616 proceeds with a first attempt at matching the aforementioned stream scores 612 with the resource scores 614 by examining those with as many overlapping scores occurring in as many overlapping categories as possible.

Once the two aforementioned sets of numerical data 612, 614 are joined in the scores comparator and merger 616 module, a prototypical series of potential matches is assembled. In an embodiment of the invention, such assembly is typically carried out by iteratively attempting to combine or otherwise fit the highest-ranking respective scores of each of the aforementioned data sets together. Once a number of highly-ranking candidate fits or combinations of said merged data has been assembled in the scores comparator and merger 616, in which one or more streams 101, 102, 103 is thus provisionally matched for processing with one or more processing resources 501, 502, 503, said provisional combinations are made available to the routing command engine 618.

It will be appreciated that the time interval(s) with which the score calculators 610, 612, 614, 616 described herein operate, calculate, regenerate, and apply said scores and attendant sorting/priority information may likewise vary as a function of the needs dictated by operational scenarios of respective embodiments of the present invention. In a further embodiment, these respective time intervals may be set independently for each of the aforementioned score calculators. It will be appreciated that in all cases, it is advisable to ensure that potential vulnerabilities resulting from lack of data freshness during the respective collection and integration of such scores is sufficiently abated as to prevent inadvertent or otherwise harmfully erroneous operation of respective embodiments of the present invention. It will be further appreciated that the precise measures to take, including but not limited to the adjustment of the aforementioned time intervals, will vary in accordance with the needs and operational scenarios of said embodiments.

The routing command engine 618 receives all provisional combinations assembled by the scores comparator and merger 616 module. In an embodiment of the invention, additional error checking or validation may be integrated into the routing command engine 618 as it proceeds to discard any provisional combinations that may be considered invalid, undesirable, or impracticable in light of specific operational or policy-related conditions. In another embodiment, such discarding may be sidestepped by selecting the provisional combination having the highest calculated weightings in as many categories as possible for a given embodiment within a given scenario. Once any and all provisional combinations deemed non-optimal or not desirable are definitively eliminated, the routing command engine 618 generates a formal routing command 650 in which the specific resource(s) 501, 502, 503 to process one or more specific streams 101, 102, 103 is expressed.

In an embodiment of the invention, the issuance of a routing command 650 by the routing command engine 618 marks the final operation step of the comparator 604, with said routing command 650 being received by the dispatching module 700.

In some deployments, heuristics such as those described herein can be collected and analyzed to further the operations of a crash recovery mechanism following the crash of a resource 501, 502, 503, or even for broader purposes of future crash prevention involving said resources. Furthermore, specific API-based failure codes can provide the basis for identifying a potential dynamic reattribution of resources 501, 502, 503 to a specific stream 101, 102, 103 to operate a specific crash recovery scenario. Thus, while handling decoding operations for a specific stream 101 having a specific set of stream parameters for example, a specific GPU-based resource might encounter a crash. Prior knowledge wherein a specific hardware processing library element used in combination with a stream of a given type is likely to result in a crash can be advantageously exploited such that in future occurrences, said library element and stream types will not be matched by the attribution module 600. In a further implementation, an amended routing command 650' can accordingly be generated immediately to implement such reattribution.

Dispatching Module

The dispatching module 700 implements 750 the stream-to-resource attribution specified by routing commands 650 issued from the comparator 604. In a further embodiment, a plurality of routing commands 650 may be issued in a burst to the dispatching module 700, which may temporarily store said plurality of routing commands 650 in a routing command queue 605. Such temporary storage of routing commands 650 may in a further embodiment be governed by a control structure consisting of wait statuses applied to various routing commands 650 in the routing command queue 605 until a specific condition is satisfied and wherein bulk number of routing commands 650 may be issued. In another embodiment, no such queue 605 need be present, with routing commands 650 received by the dispatching module 700 being provided directly to the sorting network 701. The latter module 701 may in an embodiment be implemented by way of a switch fabric which in an embodiment of the invention allows routing of input module 100 contents to the resource pool 500. In another embodiment, a semaphore or other control system adapted to and commensurate with the operational scenario of said embodiment may likewise be envisioned for said sorting network 701 in lieu of a switch fabric.

Routing commands 650 are typically issued until either no additional input media stream 101, 102, 103 is received in the input module 100, or when all processing within the resource pool 500 has completed. It will be appreciated that a key effect of the dispatching module's 700 operation is the latter's ensuring that no contention for any processing resources 501, 502, 503 present in the resource pool 500 is encountered.

Although operational stimuli ultimately originating from the operator input module 300, the input module 100, and the resource pool 500 may be correctly conceived as forming the basis of routing commands 650 generally, in a further embodiment, a new routing command 650' may be issued further to the fulfillment or completion of a previously-issued routing command 650. An amended routing command 650' may be desirable or necessary, for example, in cases where a processing resource 501 deemed best suited for a particular processing task required for a specific input media stream 101 was not initially available (e.g. not present, not accessible to an embodiment of the invention, or accessible but occupied with processing tasks for a different media stream, etc.) for said stream 101, but later becomes available. In such cases, an embodiment of the present invention may deem it desirable to interrupt the processing resource 502 at the earliest opportune moment, relieve said resource 502 of its processing duties for said stream 101, and transfer the remainder of a specific processing operation for said stream 101 to the newly-available processing resource 501 best suited for said task. In such cases, the amended routing command 650' is issued by the attribution module 600 using a process in many ways similar to that described previously. However, the generation of an amended routing command 650' occurs as a result of the resource scores calculator and sorter 614 located within the attribution module's 600 comparator's 604 receiving an update 602 regarding the recent availability of the processing resource 501 determined in the present example to be better suited than the originally-attributed resource 502. Thus, the tenure of any one specific routing command 650 may be cut short by way of an amended routing command 650'.

In a different scenario, and in a further embodiment, an amended routing command 650' may be issued to revoke the tenure of a particular processing resource 502—even if it is indeed the best suited resource available to perform a given task on a given input stream 102. This might be desirable in cases where a new input stream 101 appears in the input module 100 for processing and for which said processing resource 502 is likewise the best suited of all available resources. In such an example, the new input stream 101 may suspend the processing privileges 502 previously afforded to the previous stream 102 because the new stream 101 is specified as having (or otherwise known by said embodiment to have) higher priority or urgency than the input stream 102 previously being handled by said resource 502. Such "bumping" or reassignment of previously allocated resources by way of an amended routing command 650' may be effected for any reasons and/or criteria deemed appropriate by the specific scenarios in which specific embodiments of the present invention are deployed.

Accordingly, in circumstances unrelated to load balancing alone, a reattribution of resources to streams by way of an amended routing command 650' can operate in scenarios pertaining to recovery following a crash of a particular processing resource 501, 502, 503. As described herein, such resource reattribution can be particularly important in cases where one or more stream 101, 102, 103 parameters change—especially without prior warning—in the course of streaming. In such cases, such changes can result in over-saturation of available resources within the resource pool 500. And as discussed herein, further to such changes, a specific processing resource 501, 502, 503, previously attributed by way of a routing command 650, 650', can be unsuited and thus unable to carry on with the intended processing operation. This can occur, for example, in cases where an input media stream 101, 102, 103 is a video stream from a security camera whose vendor has deviated from a particular standard and wherein the stream encoding parameters change unexpectedly from one moment to another. In such cases, a further amended routing command 650' can be generated, such that processing of the offending stream 101 whose parameters have changed unexpectedly as to cause a crash of the processing resource 501 can be rerouted to a better suited processing resource 502. Rerouting can, in an example divert processing from an originally-attributed processing resource 501 (e.g. a hardware-specific or GPU-based decoder, such as might be offered with NVIDIA's CUDA) to another processing resource 502 (e.g. a general purpose CPU-based decoding library, such as FFmpeg). It will be appreciated that identifying the most appropriate resource(s) available within the resource pool 500 to which to potentially divert such processing in light of the unanticipated change in stream parameters can be determined, with the appropriate modifications, by combining any one or more of the various means previously described herein. In such implementations, operation of the stream detection engine 200 can be modified to specifically (re) detect the parameters of an offending stream 101, with the updated stream payload analysis result 205 accordingly being provided to the stream type information 601 listing. The aforementioned measures can in some embodiments additionally combined with buffering a portion of input media streams 101, 102, 103 so as to mitigate the potential for loss of stream data. In further implementations, such buffering can be further coupled, where technically feasible, with a more sophisticated and robust control mechanism to request retransmission of stream packets known to have been lost or dropped as a result of resource saturation.

In a further embodiment, a routing command 650 may incorporate any combination involving one or more input media streams 101, 102, 103 and any number of processing resources 501, 502, 503. This is particularly relevant in cases where multiple (but separate) processing operations must be carried out on one or more input media streams 101, 102, 103. A corollary to this, and an equally valid scenario, is one in which a specific processing operation to be carried out by a single resource 501 requires multiple input media streams 101, 102, 103.

Output Module

In cases where the processing operation(s) to perform on one or more input streams 101, 102, 103 within an embodiment of the present invention would result in a modification to the content of said input streams, one or more new result streams are generated by said embodiment. This is done so as not to destroy (or otherwise destructively overwrite) the original input stream 101, 102, 103 received. Such generation is typically required when the result of said processing 500 is also a media stream. In a further embodiment, the latter new media stream, also known as an output stream 801, is typically packaged in a format identical or similar in composition or structure to the originating stream. In a further embodiment, and particularly in cases where the output stream is a combination of multiple types of streams, or a derivation into a more limited subset of data, an optimal output stream packaging, composition, and structure (including but not limited to transport type) into which to format the resulting data is determined and selected by said embodiment. In a still further embodiment, said selection is based on maintaining similarity with said target data's constituent data, which, it will be appreciated, is a function of modifications applied by the resource pool 500, which includes without limitation, any merging or stripping of various data performed on original data streams 101, 102, 103. In another embodiment, the format of the output media stream 801 may be a function of previously-specified configuration or instruction 350 data. In a still further embodiment, said formatting of output media streams 801 depends on the availability of target codecs as well as the embodiments overall capability to encode in said format.

In another embodiment, the input stream data integrity conservation principle described above may be waived either in whole or in part. In the latter case, said waving may be implemented on some conditional criteria, specified in said embodiment as part of the configuration data and instructions 350 supplied to said embodiment. In a further embodiment, no input stream 101, 102, 103 is conserved but rather is acted upon directly by one or more resources 501, 502, 503 in the resource pool without any prior data copying.

Once the output media stream 801 is generated or otherwise made available in the output module 800, it may be rendered available for use by being output to specific locations, including but not limited to storage media or to a URL accessible by an embodiment of the present invention 999. In another embodiment, said output module 800 may be entirely optional, with the raw results of processing pool 500 being made directly available to said storage media or accessible URL 999.

In a further embodiment, particularly one in which copies of the streams 101, 102, 103 are fetched and placed into the input module 100, such input stream data integrity conservation may be viewed as a still further option that is desirable in an even more limited series of scenarios.

Display Management Module

A further module that may be optionally present in certain embodiments is the display management module 900. In certain settings, embodiments of the present invention may be accompanied by a screen or other visible area or surface that enables a human operator, such as a guard sitting at a security desk, video wall, or video monitoring workstation, to view the one or more input 101, 102, 103 and/or output 801 media streams available to embodiments of the present invention. In a further embodiment, said display management module 900, 900' may present additional media streams and/or other data fetched from an external source 099, but which have not required fetching and placing into the input module 100 for subsequent processing. The display of such streams may be implemented by way of a GPU dedicated for display purposes and set up to arrange said streams in a multi-tile or multi-window layout, said layout and arrangement selection being provided to the display management module 900 by way of one or more display signals received by the latter module 900 by said dedicated display GPUs. In a further embodiment, if said additional media streams require processing by said embodiment of the invention, said streams are fetched from their original locations 099 and made available to the input module 100, as discussed herein. Streams not requiring processing may likewise be fetched 099 separately and shown in the display management module 900.

In a further embodiment, the display management module 900 may allow one or more (typically human) operators to specify a particular set of instructions. Said instructions, otherwise known as operator input 950, may be issued by any HID or HID-like means, such as through a touch screen monitor on which aforementioned input 101, 102, 103 and output 801 is displayed. Said instructions 950 are transmitted to the operator input module 300, previously discussed herein, for handling by said embodiment of the present invention. In a still further embodiment, said operator input 950 may be limited to specific tasks, including, in a non-limiting enumeration, decreasing the framerate of a given video stream, pausing a stream, specifying a region of interest within a given stream for purposes such as zooming, specifying full-framerate decoding of one or more high-resolution streams, and other image processing tasks.

In a still further embodiment of the invention, the display management module 900 may be subject to various levels of user privilege and/or accessibility for various human user types. Without limiting the foregoing, levels might include such profile types as non-existent (where no access to any display content is granted, for example), spectator (with view privileges only), limited functionality, advanced functionality, superuser, wherein each successive user profile grants additional privileges and/or access to said profile holder, which in turn influences the extent of the operator input 950 that said profile holder might supply. In another embodiment of the invention, the display management module 900 may be associated with the aforementioned operator input module 300. It will be appreciated that user or operator input to signal the occurrence of anomalous operation of any one or more streams displayed can be accepted. Such input can be useful, for example, to signal to administrative personnel the occurrence of an apparent crash of a component or other performance-related issues. In another embodiment, the two modules 300, 900 may be entirely (including physically) distinct from one another.

An important element in crash recovery capabilities as described herein concern the possible failover qualities discussed for various deployments. A similar element in the crash recovery process concerns the quality with which such failover is achieved. The seamless handling of decoder or other resource crashes is a similarly valuable quality to a resource crash recovery implementation. Moreover, in many deployments, a failover implemented in such manner as to effect a minimally user-perceptible switchover is envisioned. Furthermore, handling of such resource-related abnormalities, whether crashes or other abnormal terminations, is carried out such as to minimally impair or affect the functionality of the resource impacted by a crash.

Thus, a crash of a resource 501 such as a GPU-based decoder in the course of decoding an input stream 101 can result in said input stream 101 being decoded by a CPU-based decoding resource 502 with minimal turnaround time. In this hypothetical example, input stream 101 can be processed into output media stream 801. Output media stream 801 can accordingly be displayed within a display management module 900, occupying all or, in a further implementation, a tiled portion thereof.

Crash recovery mechanisms as described herein can accordingly and individually target any one or more single output media streams 801 displayed within a display management module 900. Accordingly, a single output media stream 801 can occupy a specific tile within a display management module 900. In the case of an allocated processing resource's 501 crash or other operational abnormality, processing of the input media stream 101 corresponding to the output media stream 801 occupying a single tile can be restarted. In implementations, restarting of processing can involve the allocation and attribution of a second processing resource 502 to the input media stream 101. The foregoing can be implemented such that visible and/or human perceptible interruption to the output media stream 801 can be minimal or even imperceptible. Following an amended routing command 650', processing of the input media stream 101 can resume with the second processing resource 502, potentially a CPU-based one, carrying on with processing. Playback or live streaming of the corresponding output media stream 801 within the display management module 900 can, to a human operator, continue to appear within its previous position or allocated tile space to have been minimally impaired or otherwise affected by any adverse operational issue. As described herein, measures such as buffering techniques and/or other dejittering methods can be advantageously used to minimize observable video or image degradation, noise, or other undesirable artifacts.

ADDITIONAL CONSIDERATIONS

Further consideration of various aspects of modules involved in various embodiments of the present invention may be given. For example, various components of, and indeed the modules described herein and which make up embodiments of the present invention need not be physically contiguous nor be within a proximate geographic area. In some embodiments, various modules or aspects thereof described herein may be connected to or within said embodiments by way of some network connection, such as a LAN or the internet. In a similar vein, the implementation of various aspects, components, or functionalities described herein as being implemented within a specific module or submodule need not be interpreted as being necessarily limited, whether in whole or in part, or for any embodiment of the present invention, to said modules as disclosed herein. Likewise, any or all of the aforementioned modules may be implemented, in whole or in part, in one or more distinct computers. Finally, modules described herein and connected through a network may be connected among said one or more computers through any networking technology, topology, without limitation.

FIG. 11 shows an example partial layout of an embodiment involving the processing steps described herein in the case of hardware-based processing resources. A board using the Maxwell microarchitecture can non-limitingly be envisioned for implementation in such cases. Packets for an input stream are received from a source, such as a storage device, media, or URL 099, and must be reassembled, and interpreted, such interpretation having been discussed herein in the stream detection engine 200 section. Such detection can, among other things, serve to determine and identify the nature of an input stream 101. This can include determining the encoding standard (such as H.264 or H.265) with which the input stream 101 complies. It will be appreciated, as discussed herein, that parameters or elements of the input stream 101 can change dynamically and unexpectedly, and that the nature of the new parameters must likewise be detected for purposes of properly recovering from (or averting) a processing resource 501, 502, 503 crash.

A critical processing step, for certain embodiments discussed herein, is the decoding 501" of an input stream 101. In an implementation, a video decoder 510 module can communicate with various different hardware and/or software resource implementations. Such implementations can non-limitingly include processing resource libraries, which can non-limitingly include FFmpeg's AVCodec, NVIDIA's CUDA, and Intel's QuickSync. Implementations can further communicate with any one or more GPU-based or CPU-based layouts configured to communicate with and/or operate using any one or more of the foregoing processing resource libraries.

Communication with any one or more of the foregoing types of processing resource libraries can involve the use of API calls offered by said processing resource libraries, which operate within the driver. In FIG. 11, the CUDA library block is non-exhaustively illustrated as communicating with an NVIDIA driver 530; other implementations can include a similar communication and interoperation structure within any one or more other processing resource libraries. Use of the foregoing API calls enables interaction with the hardware or software processing components which can populate the resource pool 500. A CUDA-based implementation can for example leverage a software object known as an NVCUVID decoder 520, of which one or several instantiations can be made. The NVCUVID decoder 520 is itself a creature of the NVCUVID API, a specific application programming interface allowing the decoding of video on CUDA-based GPUs. The NVCUVID driver, is itself implemented by the API provider (NVIDIA) within said provider's driver 530. A high-level API-based interaction with the GPU typically obviates the need for integrating parties to be aware of operation or implementation details of such codecs or other processing resources within a GPU.

It will be appreciated that NVAPI and the CUDA API itself can both be used by the NVIDIA driver for compatible GPU boards. It is possible to inquire the resource capabilities, for example, of several Maxwell architecture-based NVIDIA GPUs, using NVAPI, an application programming interface provided by NVIDIA to directly access and control core elements of NVIDIA GPUs on Windows platforms. Such resource capability inquiries can non-limitingly allow general identification such as version determination and driver identification. In an embodiment involving a compatible NVIDIA GPU, for instance, it can be possible to instead make direct use of the CUDA API for at least a portion of the latter's functional breadth rather than rely on software or API-based inquiries of fundamental processing capabilities of the GPU itself. For example, an active attempt to test a possible operation of a specific processing step could optionally or likewise be made. It is likewise envisioned that in deployments it might not be feasible to implement or otherwise replace all API functionality with a single API, such as CUDA. For example, CUDA does not provide access to dedicated H.264 and H.265 decoding resources (for which purpose NVCUVID is useful), owing to the fact that CUDA is an API for programming CUDA cores. CUDA likewise does not provide access to performance counters and other statistics provided by NVAPI. Thus, in implementations, a combined or concerted use of multiple APIs can not only prove advantageous, but potentially even necessary. It will be appreciated that other hardware and software vendors offering varying technologies can likewise be envisioned for operation within a comparable paradigm. While current operating system paradigms limit allocation and use of a single driver at a time for a specific GPU board, for instance, it will likewise be appreciated that multiple libraries can be used to inquire or otherwise interact with driver. In the case of NVIDIA graphics cards, Applicant has successfully implemented crash recovery mechanisms for use with cards having a compute capability of or greater than 2.1 and with at least 512 MB of VRAM. Similarly, Intel-based solutions require that a CPU support the latter vendor's QuickSync technology.

It will be appreciated that the GPU board driver supports a specific version of a parallel computing platform and related API(s). Thus, for example, the NVIDIA driver 530 can support a specific version of CUDA, said version being dependent on the capabilities of the GPU itself. Capabilities are likewise related to the hardware available on the GPU to perform specific operations, whether dedicated or otherwise, as well as the APIs' own abilities to exploit such resources and operations. Version-related particularities, such as operational limitations, incompatibilities, and even performance improvements, can be introduced by or further result from changes in the versions of platforms, such as CUDA, used on a GPU. For example, on GPU boards implementing the Maxwell microarchitecture, a sevenfold increase (from 2 to 14) in the number of high-definition stream 101 decoded has been noted with a migration from CUDA version 3.5 to version 5. It will be appreciated that in addition to more optimized CUDA instructions, such an increase can also be attributed in part to such GPU boards having additional cycles and memory available to carry out decoding specific to the H.264 or H.265 types. The existence or exploitation of specific dedicated resources, such as a hardware component to more rapidly and efficiency carry out such processing, can also provide significant performance improvements.

Despite the foregoing, as discussed for various implementations herein, GPU-based decoding and other processing can be limited or otherwise result in poor decoding capabilities in cases of non-standard or unexpected changes in stream parameters, or oversaturation of existing resources and limited on-board resources (such as might happen when too large a number of streams is received, or a resolution or framerate of existing streams increases the load on the processing pool 500).

Gracefully handling such unexpected cases can, as discussed herein, prove more flexible when a solution comprising general-purpose CPU-based resources is provided. Structuring deployments in such a manner as to minimize the frailty can decrease overall vulnerability and enhance overall robustness. The applicant has determined that implementing seamless a GPU-to-CPU crash recovery resource substitution as discussed herein, whether dynamically or as a general rule, can greatly contribute to such enhanced robustness. Notwithstanding the foregoing, it is likewise envisioned that GPU-based resources can be similarly exploited to implement failover mechanisms from crashed or otherwise abnormally terminated CPU- or software-based resources.

No explicit exclusion from the crash recovery mechanisms described herein of streams 101, 102, 103 having specific parameter characteristics is envisioned. It will nonetheless be appreciated that applying little to no discerning criteria to the parameter characteristics of input streams 101, 102, 103 deemed eligible for (or desirably suited to) such crash recovery mechanisms can prove detrimental to overall performance of implementations. Workstation particularities, including a careful survey of resources available and overall processing power, in addition to suitability assessments in light of data transfer costs between GPUs and a CPU (e.g. for low bandwidth streams) should in deployments be taken into consideration.

At the same time, it will be appreciated that many factors determine how many streams of one or more supported format sat specified framerates can be successfully decoded (or otherwise processed). Such factors include dynamic usage. Thus, additional streams should not be added to an already overburdened graphics card. Likewise, hypothetical or planned usage should be taken into account; typically, such planning should involve heuristically-derived data or benchmarks.

What is claimed is:

1. A video decoding system for simultaneously decoding a plurality of encoded video streams of one or more video compression formats and displaying each resulting decoded video stream in a predetermined tile of a display, the system comprising:
   a data interface configured to receive said plurality of encoded video streams;
   a processing unit (CPU) in communication with the data interface;
   a display control device in communication with the CPU, the display control device comprising a graphical processing unit (GPU); and
   a display in communication with the display control device, memory storing an attribution module configured to
      direct each encoded video stream of the plurality of encoded video streams to be decoded by the GPU, and
      survey decoding resources available to determine how many streams can be successfully decoded, anticipate a processing load associated with said plurality of encoded video streams, and in response redirect a given one encoded video stream of the plurality of encoded video streams from being decoded by the GPU to being decoded only by the CPU so as to avoid instantiating too great a number of resources on the GPU.

2. The video decoding system of claim 1, wherein the GPU is configured to decode each encoded video stream of the plurality of encoded video streams and send the resulting decoded video stream to a respective predetermined tile of the display, wherein the data interface is configured to redirect said given one of said encoded video streams from being decoded by the GPU to a given predetermined tile to being decoded only by the CPU with instruction to display said given one of said streams in the same given predetermined tile of said display.

3. The video decoding system of claim 1, further comprising a resource monitoring engine populating a resource table comprising information about the available decoding resources.

4. The video decoding system of claim 3, wherein the resource monitoring engine is configured to populate the resource table with data obtained from resource utilization data queries.

5. The video decoding system of claim 3, wherein the resource table comprises information about the available decoding resources including information as to the maximum number of streams that each resource of the available decoding resources is permitted to accept at any one time.

6. The video decoding system of claim 5, wherein the attribution module is further configured to execute the decision using a routing command.

7. The video decoding system of claim 3, wherein each encoded video stream of the plurality of encoded video streams are associated with respective stream type information, wherein the attribution module is further configured to receive the stream type information for each encoded video stream of said plurality of encoded video streams and compare it with data from the resource table to formulate a decision as to which encoded video stream to assign to which available processing resource.

8. A video decoding system for simultaneously decoding a plurality of encoded video streams of one or more video compression formats and displaying each resulting decoded video stream in a predetermined tile of a display, the system comprising:
   a data interface configured to receive said plurality of encoded video streams;
   a processing unit (CPU) in communication with the data interface;
   a display control device in communication with the CPU, the display control device comprising a graphical processing unit (GPU); and
   a display in communication with the display control device,
   memory storing an attribution module configured to
      i) direct each encoded video stream of the plurality of encoded video streams to be decoded by the GPU,
      ii) in response to an oversaturation of existing resources resulting from receiving too large a number of encoded video streams, specifying an additional manipulation operation on at least a subset of said plurality of encoded video streams, the additional manipulation operation adapted to reduce the resource utilization by each encoded video stream in the subset of the plurality of encoded video streams.

9. The video decoding system of claim 8, wherein the additional manipulation operation comprises reducing the framerate by dropping the processing of a number of frames.

10. The video decoding system of claim 8, wherein the additional manipulation operation comprises temporarily pausing a stream.

11. The video decoding system of claim 8, wherein the additional manipulation operation comprises reducing the resolution of a stream.

12. The video decoding system of claim 8, wherein the attribution module further comprises a stream score calculator configured to detect the oversaturation of the existing resources by computing that the plurality of encoded video streams exceeds a maximum threshold permitted.

13. The video decoding system of claim 12, wherein the attribution module is further configured to provide a weighed value for each of the encoded video stream of the plurality of encoded video streams, the weighed value indicating which of the plurality of encoded video streams should be the subject of the additional manipulation operation.

14. A video decoding system for simultaneously decoding a plurality of encoded video streams of one or more video compression formats and displaying each resulting decoded video stream in a predetermined tile of a display, the system comprising:
    a data interface configured to receive said plurality of encoded video streams;
    a processing unit (CPU) in communication with the data interface;
    a display control device in communication with the CPU, the display control device comprising a plurality of processing resources, each processing resource of the plurality of processing resources comprising a graphical processing unit (GPU); and
    a plurality of displays in communication with the display control device, each display being connected to a respective GPU,
    memory storing an attribution module configured to direct each encoded video stream of the plurality of encoded video streams to be decoded by a respective GPU according to a load balancing policy determining attribution of the encoded video streams to respective processing resources in accordance with a deployment scenario.

15. The video decoding system of claim 14, wherein the attribution module is further configured to shift processing away from one resource towards another according to the load balancing policy.

16. A video decoding system for simultaneously decoding a plurality of encoded video streams of one or more video compression formats and displaying each resulting decoded video stream in a predetermined tile of a display, the system comprising:
    a data interface configured to receive said plurality of encoded video streams;
    a processing unit (CPU) in communication with the data interface;
    a display control device in communication with the CPU, the display control device comprising at least one graphical processing unit (GPU);
    a display in communication with the display control device; and
    memory storing an attribution module configured to direct each of the plurality of encoded video streams to be decoded by one of the CPU and the GPU, and to detect that a compression or encoding format of a encoded video stream of the plurality of encoded video streams corresponds to a compression or encoding format that is identified to trigger a crash on a GPU of the at least one GPU and the CPU, to cause a skipping of one or more image frames of the encoded video stream of the plurality of encoded video streams with the compression or encoding format that is identified to trigger a crash of a GPU of the at least one GPU and the CPU.

17. A video decoding system for simultaneously decoding a plurality of encoded video streams of one or more video compression formats and displaying each resulting decoded video stream in a predetermined tile of a display, the system comprising:
    a data interface configured to receive said plurality of encoded video streams;
    a processing unit (CPU) in communication with the data interface;
    a display control device in communication with the CPU, the display control device comprising a graphical processing unit (GPU); and
    a display in communication with the display control device, memory storing an attribution module configured to
        direct each encoded video stream of the plurality of encoded video streams to be decoded by the GPU, and
        survey decoding resources available to determine how many streams can be successfully decoded, anticipate a processing load associated with said plurality of encoded video streams, and in response direct a given one encoded video stream of the plurality of encoded video streams or a future encoded video stream to being decoded only by the CPU instead of the GPU so as to avoid instantiating too great a number of resources on the GPU.

* * * * *